United States Patent [19]

Stuart et al.

[11] Patent Number: 5,491,321
[45] Date of Patent: *Feb. 13, 1996

[54] WELDING GUN ASSEMBLY

[75] Inventors: Kyle H. Stuart; Dale R. Bervig, both of Wichita, Kans.

[73] Assignee: Tweco Products, Inc., Wichita, Kans.

[*] Notice: The portion of the term of this patent shall not extend beyond the expiration date of Pat. No. 5,338,917.

[21] Appl. No.: 2,613

[22] Filed: Jan. 11, 1993

Related U.S. Application Data

[63] Continuation-in-part of Ser. No. 843,322, Feb. 26, 1992, Pat. No. 5,338,917.
[51] Int. Cl.⁶ ..................................................... B23K 9/173
[52] U.S. Cl. .................. 219/137.61; 219/137.41
[58] Field of Search .................. 219/137.41, 137.63, 219/137.61, 136, 137.2

[56] References Cited

U.S. PATENT DOCUMENTS

| | | | |
|---|---|---|---|
| 3,469,070 | 9/1969 | Bernard et al. | 219/137.61 |
| 4,016,398 | 4/1977 | Herrick | 219/137.41 |
| 4,297,561 | 10/1981 | Townsend et al. | 219/137.63 |
| 5,338,917 | 8/1994 | Stuart et al. | 219/137.63 |

FOREIGN PATENT DOCUMENTS 0502421  9/1992  European Pat. Off. .......... 219/137.41

*Primary Examiner*—Clifford C. Shaw
*Attorney, Agent, or Firm*—Senniger, Powers, Leavitt & Roedel

[57] ABSTRACT

A welding gun assembly including a contact tip and gas diffuser having increased electrical conductivity and heat dissipation and a spool gun assembly having a rotatable and articulatable conductor tube mounted on the handle member thereof and a smoke gun assembly with a manually adjustable vacuum control member on the handle member and wherein the handle member conforms to the hand of the operator and includes an elongate trigger member thereon.

37 Claims, 23 Drawing Sheets

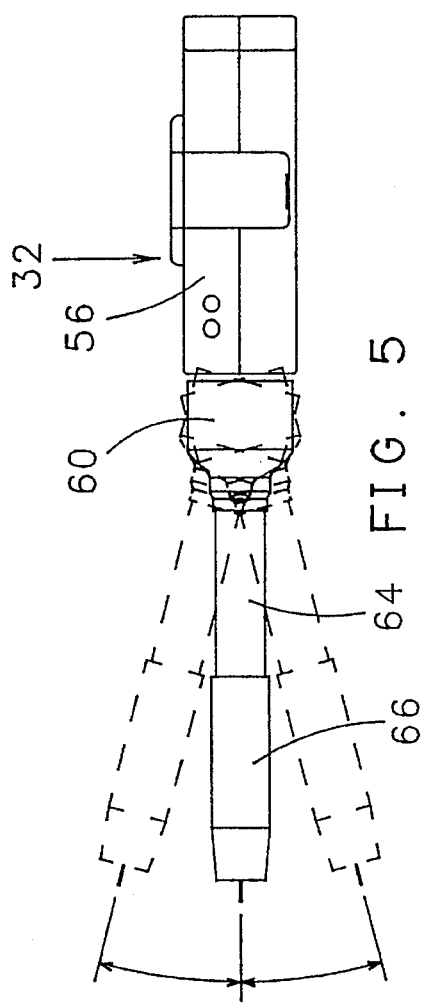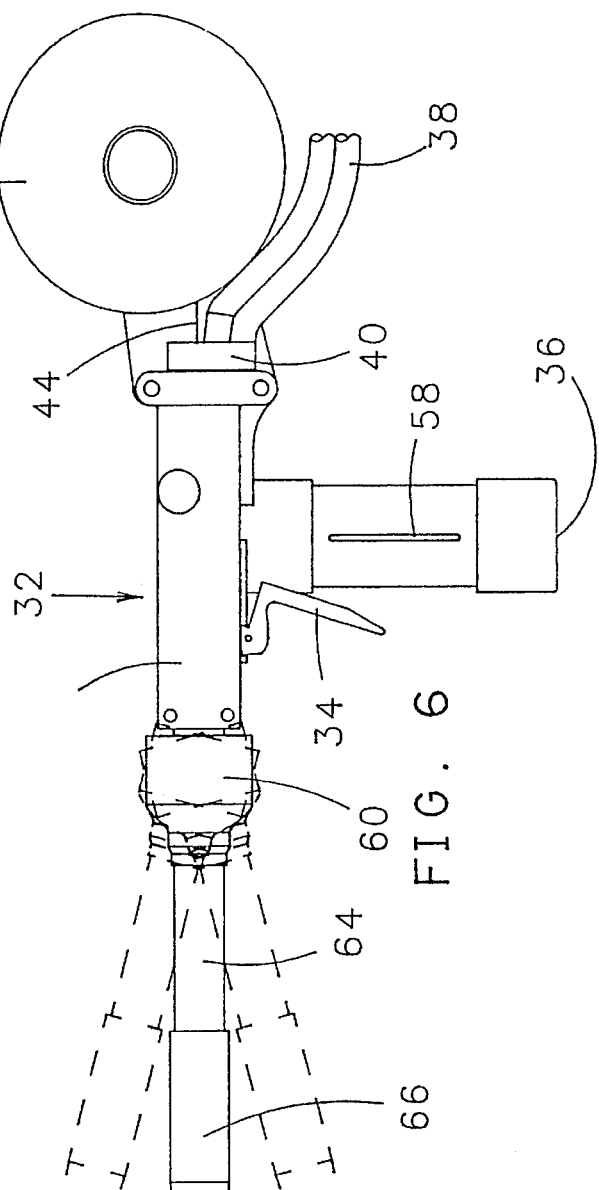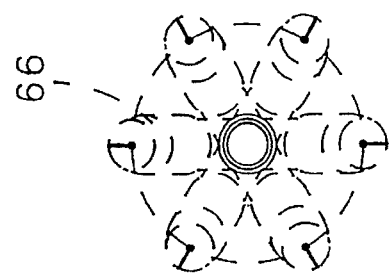

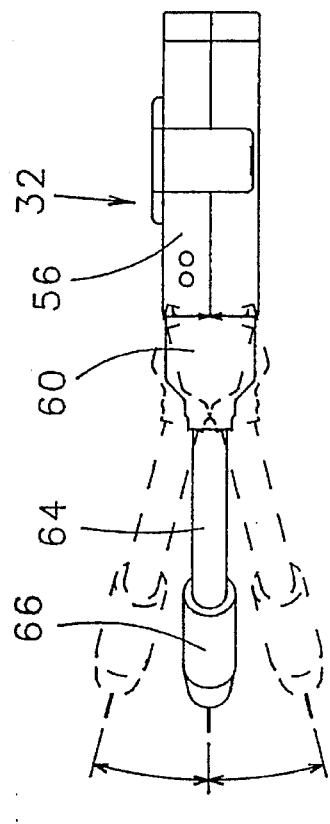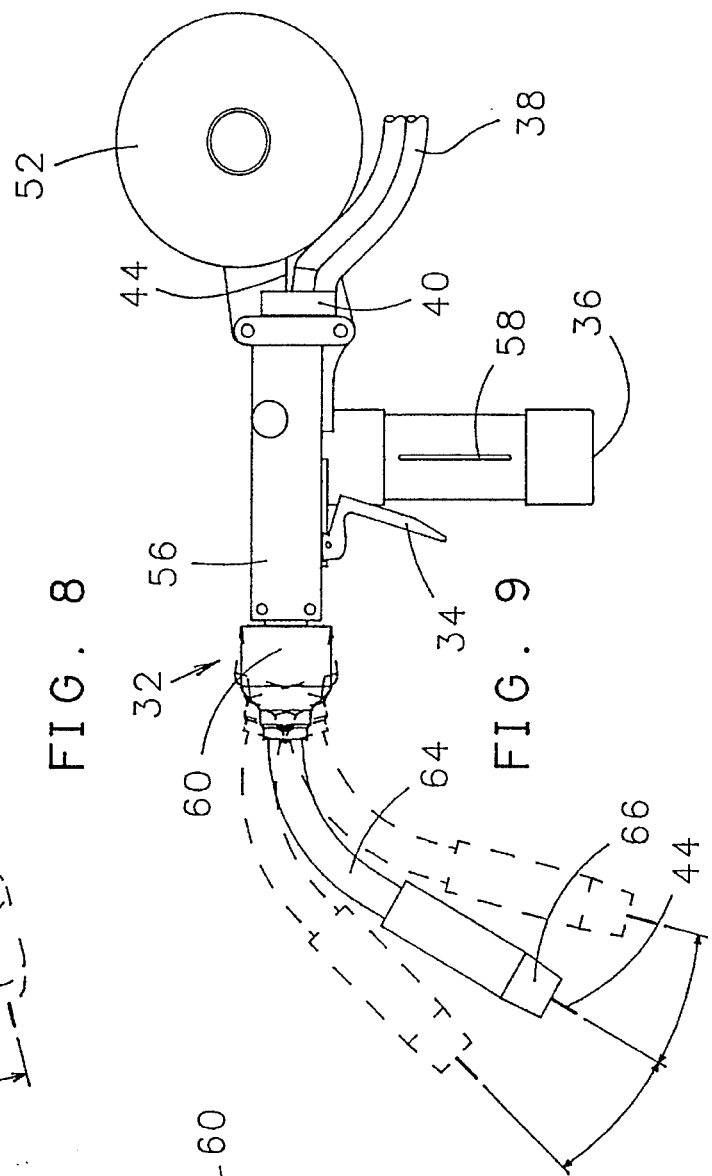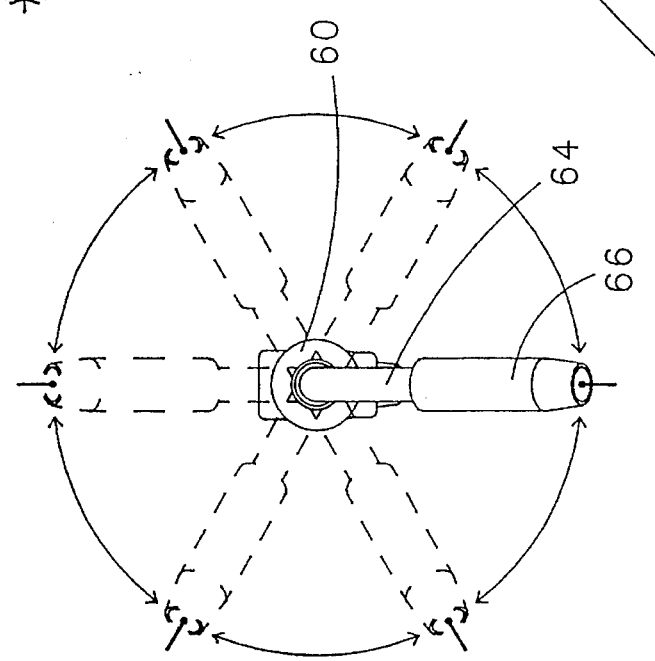

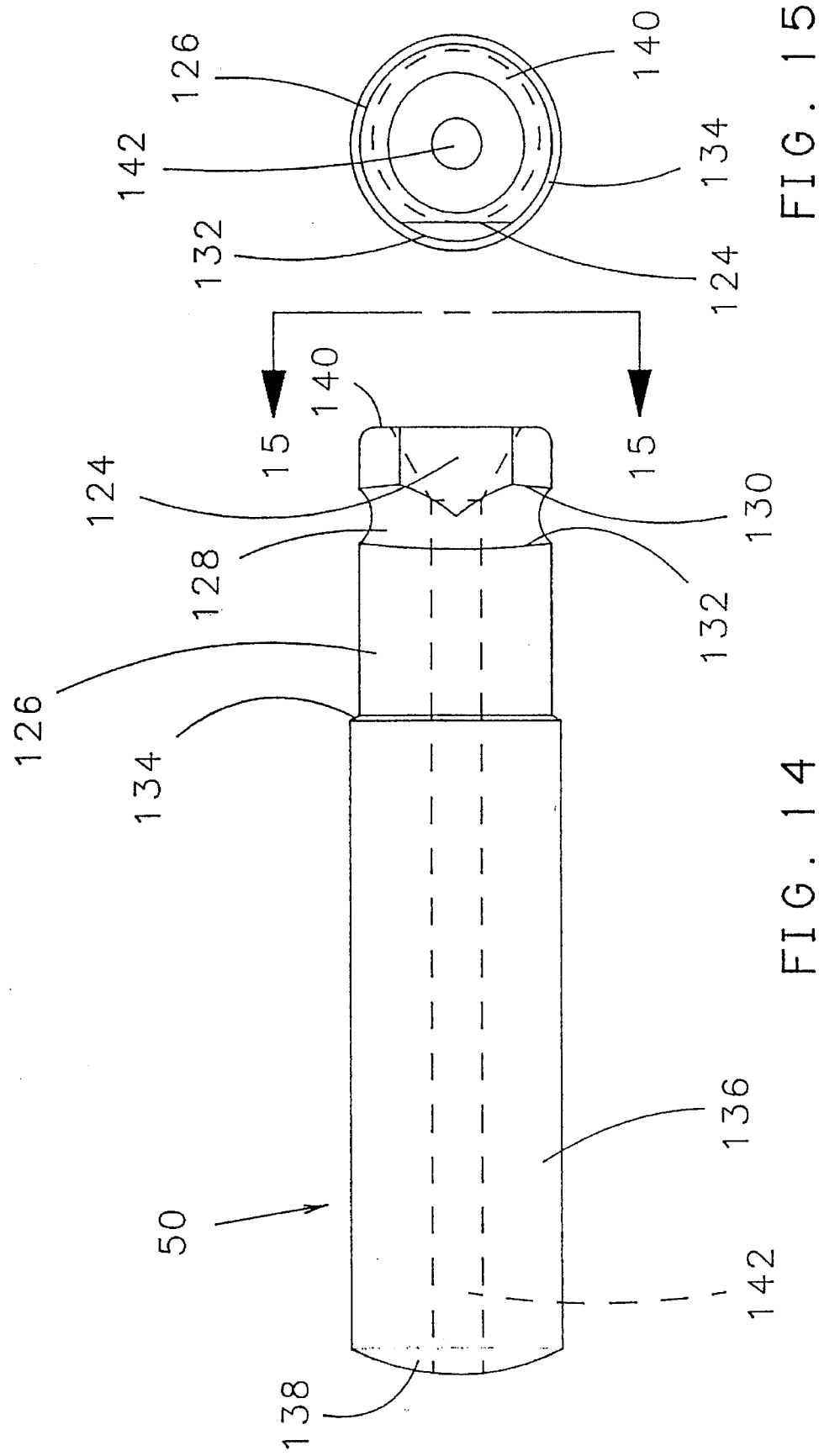

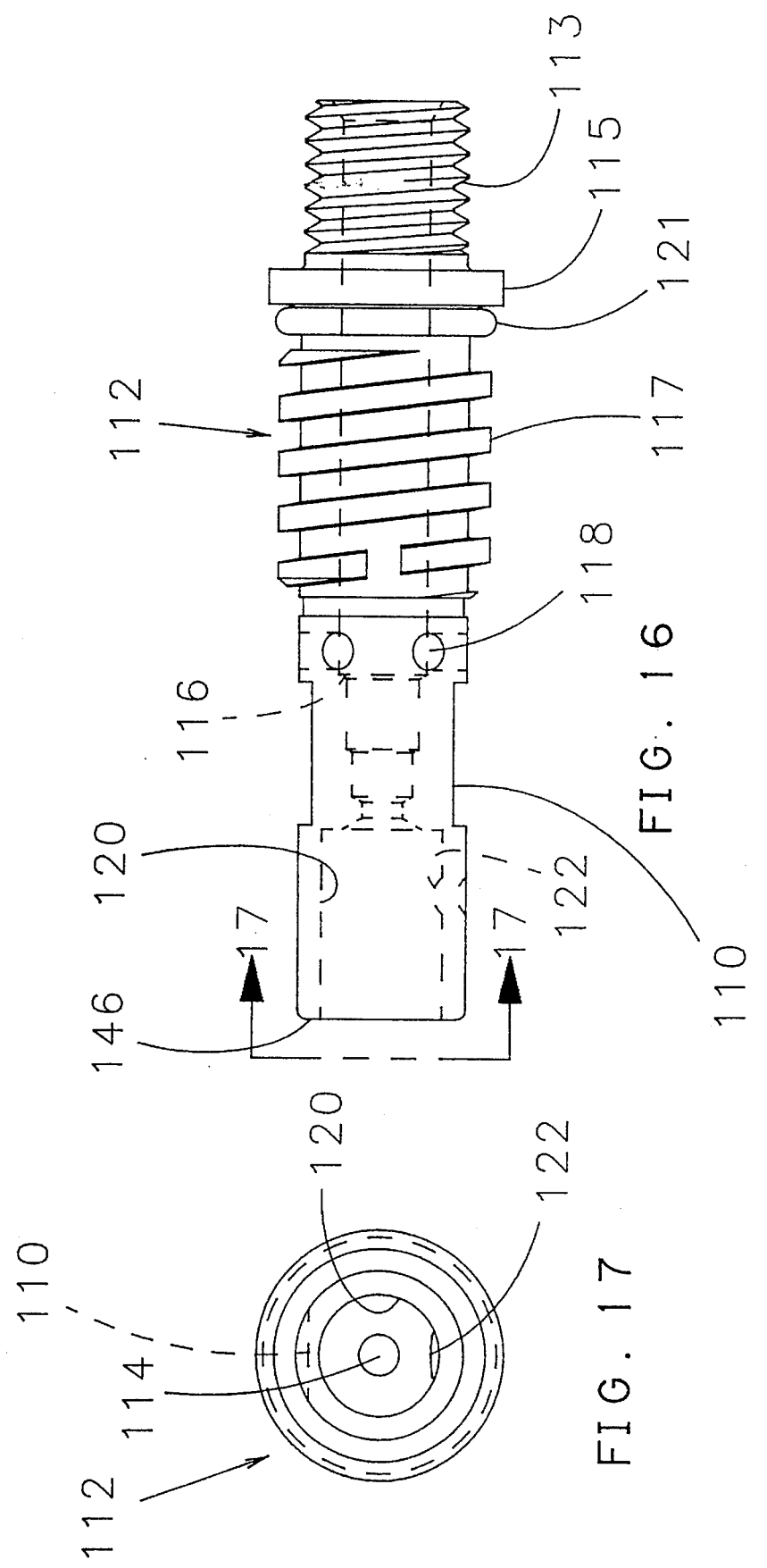

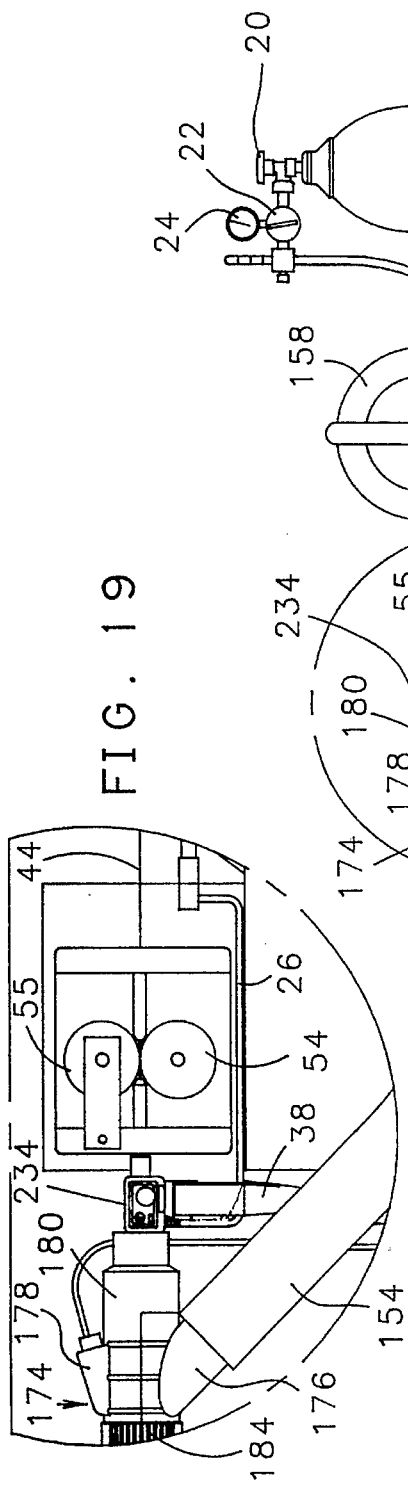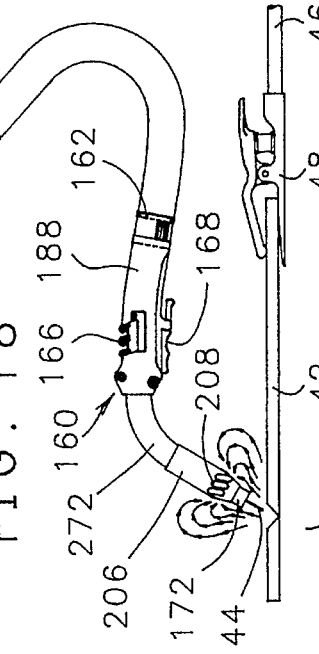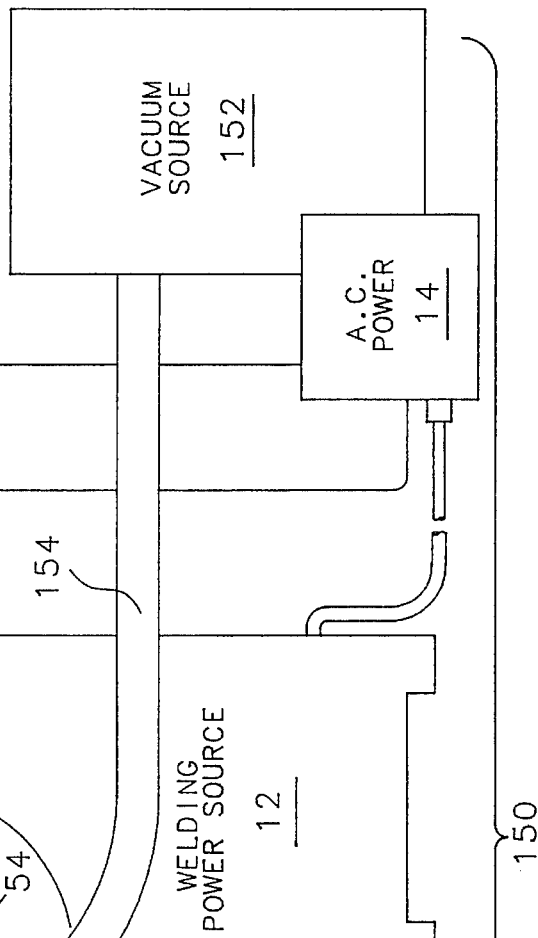

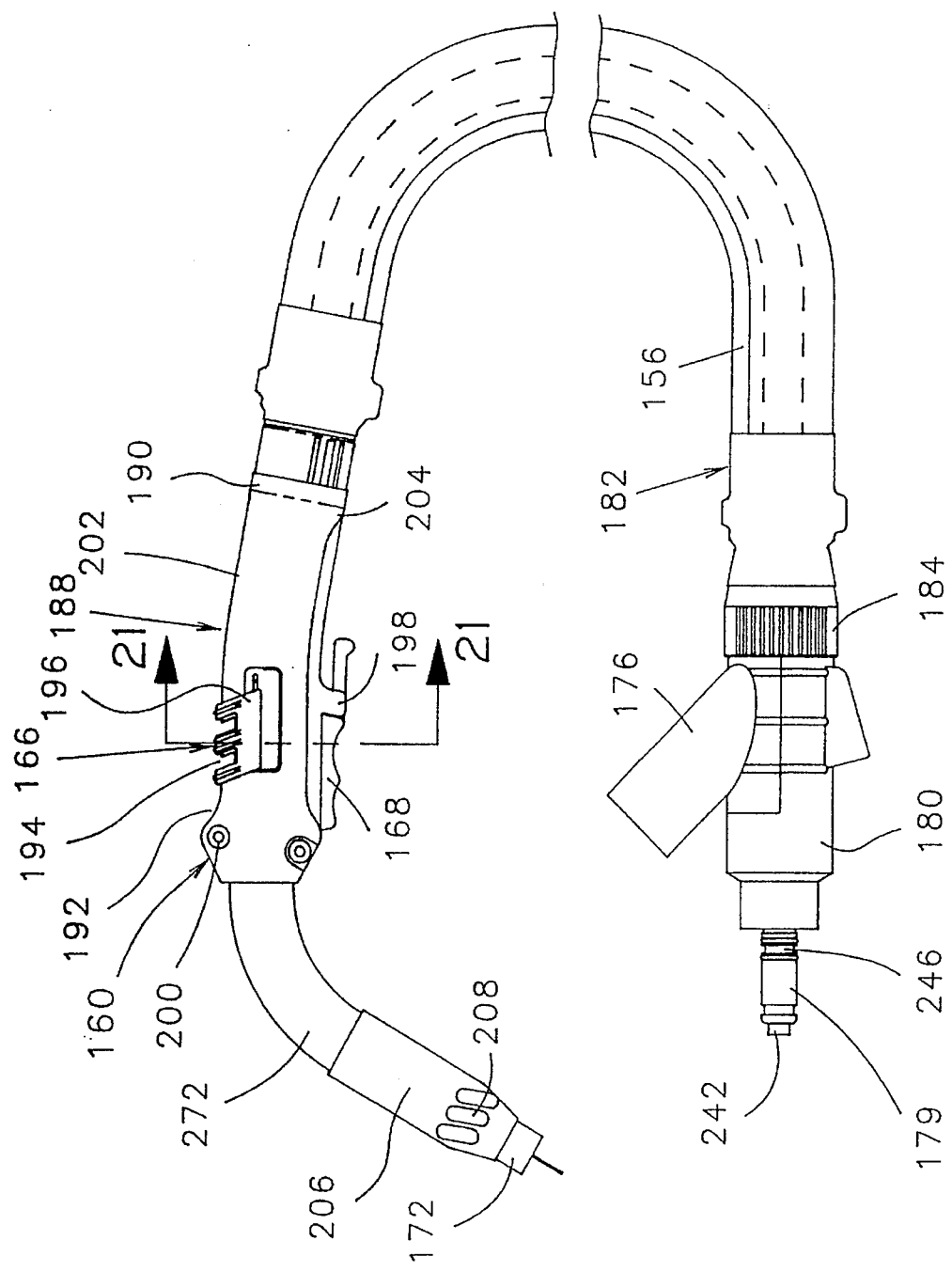

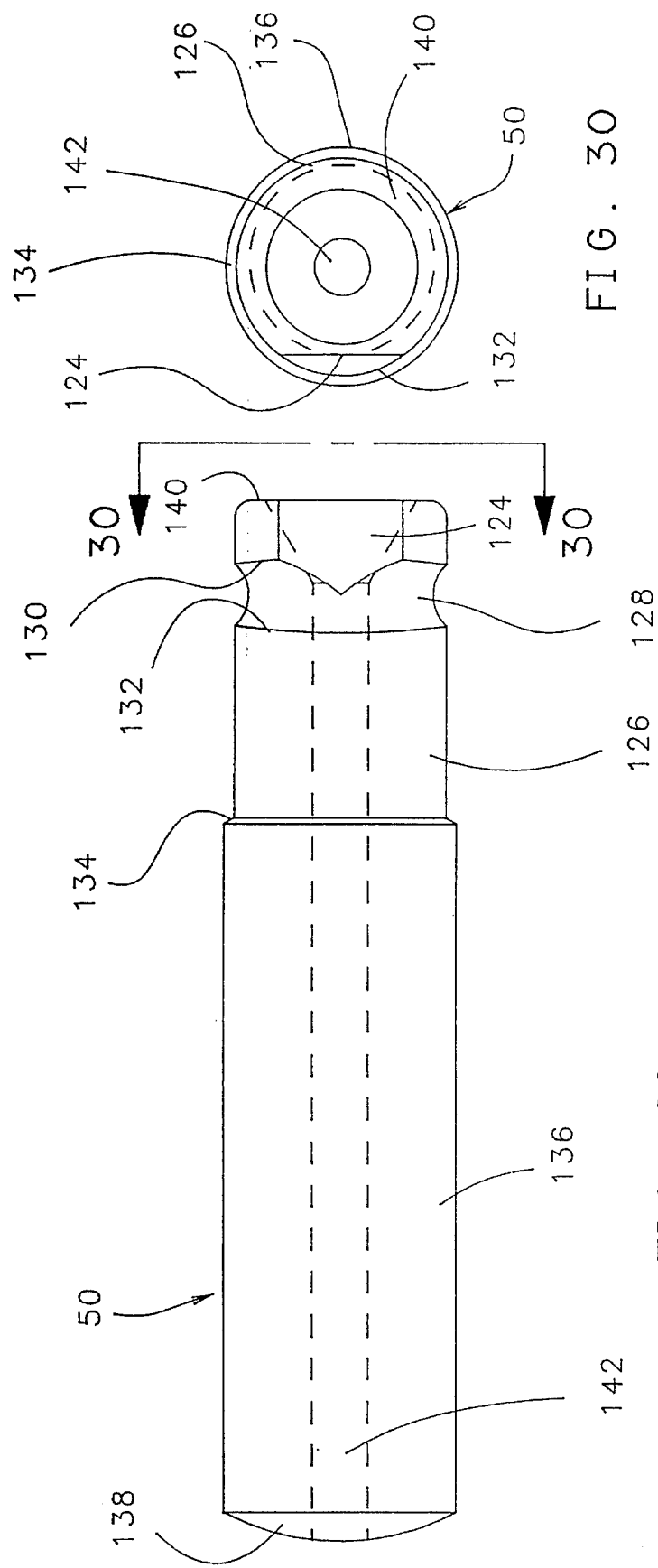

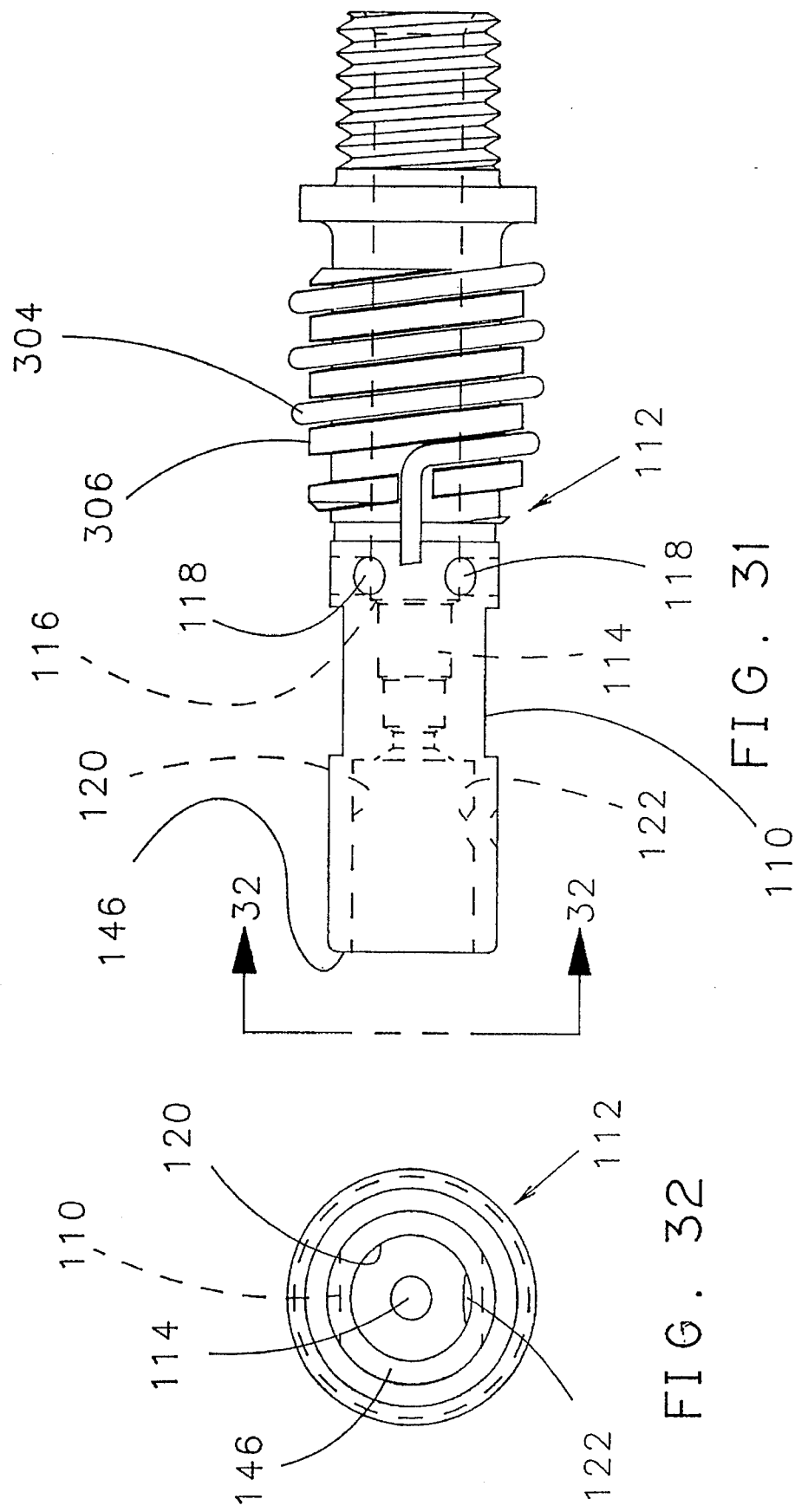

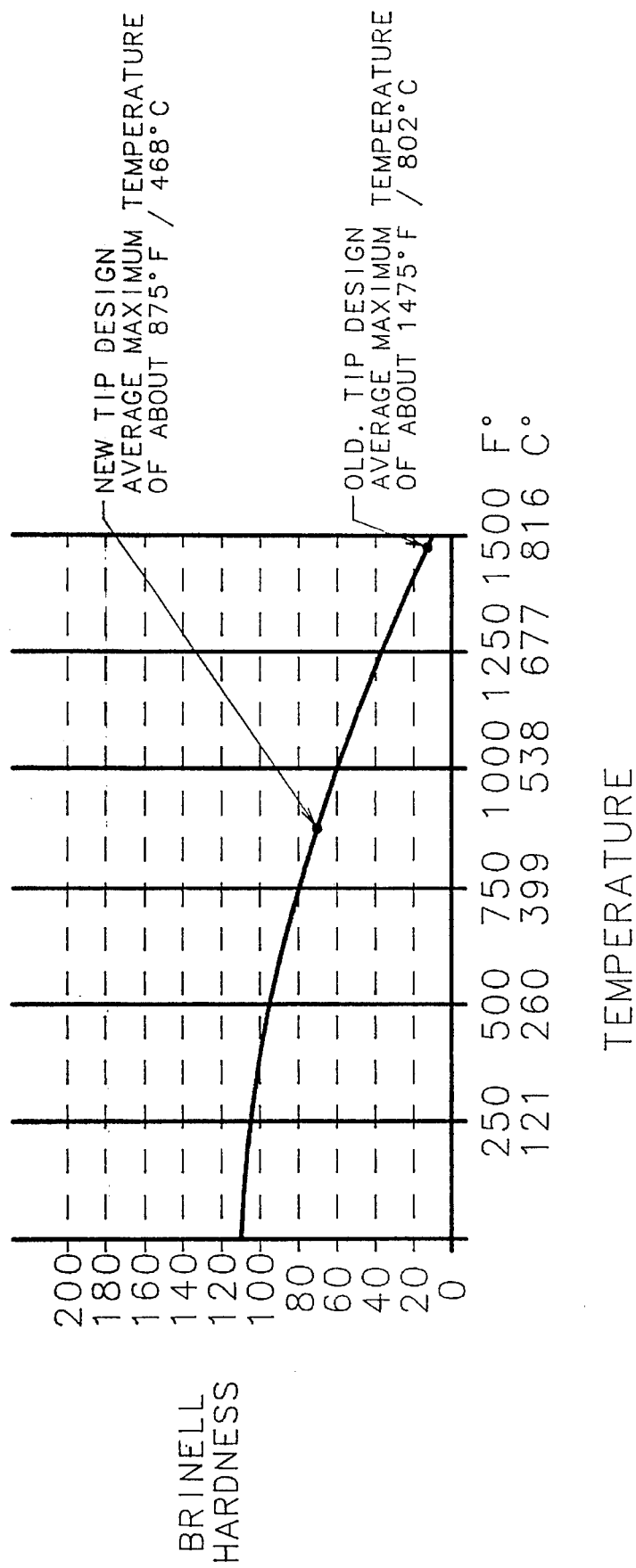

WELDING GUN ASSEMBLY

CROSS-REFERENCE TO RELATED APPLICATION

This application is a continuation in part of U.S. patent application Ser. No. 07/843,322, entitled "ERGONOMIC WELDING GUN WITH QUICK DISCONNECT ASSEMBLY," filed on or about Feb. 26, 1992 now U.S. Pat. No. 5,338,917.

BACKGROUND OF THE INVENTION

1. Field of the Invention

The present invention is directed to improved welding systems particularly adapted for use in gas metal arc welding (GMAW) which is commonly referred to in the industry as "MIG" type welding. The term MIG stands for the metal inert gas where the inert gas is forced through the front end of the welding gun to provide a surrounding layer or blanket of inert gas to protect the molten welding puddle. The inert gas is typically a combination of various gases such as argon, carbon dioxide and oxygen.

There are a number of various types of MIG welding systems currently available. These MIG welding systems include specifically "push-pull" or "spool guns", "smoke extraction" or "smoke guns", "water cooled guns" or "air cooled guns" or variations of each type of gun that have particular features which are preferred for use with certain materials or in certain welding situations. In addition to the common use of inert gases, the MIG welding systems also utilize continuous welding wire which may be rolled onto a spool and fed through a coaxial welding cable to the welding gun or fed through the gun from a spool mounted on the gun. Because of the continuous welding wire, MIG welding systems are generally faster than tungsten inert gas (TIG) systems or conventional stick welding systems which utilize individual welding rods.

2. Description of the Prior Art

MIG welding systems have been widely used in the United States and other places around the world since at least the 1960's. The present invention is directed to a number of improvements in conventional welding systems and more particularly in improvements in MIG welding systems such as spool guns and smoke extraction or smoke guns.

Spool guns are a specialized type of MIG welding system where a spool of wire is mounted on or near the gun portion of the welding system rather than near the power source as in conventional MIG welding systems. Spool guns are particularly suited for use in situations where the welding wire is aluminum and/or it is desirable to have a welding cable of twenty-five feet or more. One such area of use is in the construction or repair industry where the power source may be mounted on a truck or other movable platform where the welding surface may not be conveniently located within the 10 or 15 foot radius commonly necessary to use a conventional MIG welding system.

Smoke extraction or smoke guns are another specialized type of MIG welding system which is particularly suited for welding in confined areas or where galvanized metals are used. A smoke gun allows the user to draw the smoke which is created by the welding process through the welding system by a vacuum system which filters the welding fumes to remove the particulate matter therefrom, thereby reducing the exposure of the operator to the smoke.

One of the difficulties with many of the currently available MIG welding systems relates to the handle and conductor tube of the welding assembly. In welding, it is imperative that the welder be able to provide a durable weld between varied materials in a variety of situations. This can only be accomplished with consistent and steady movement of the welding gun across the materials which are being welded. In many situations, the welder is required to make the same weld repeatedly at awkward or inconvenient angles. In other situations, the welder may be required to make durable and consistent welds at varied angles and orientations to the materials to be welded.

It is extremely difficult to provide a consistent weld with many of the currently available systems which utilize a straight handle because the handle may be awkward to grasp for long periods of time and may also include a conductor tube which is oriented at a fixed angle to the gun. With repetitive welding, the welders hands and arms may tire due to the difficulty of gripping the handle at the same orientation for an extended period of time to actuate the trigger on the gun. When the welder is required to weld at a variety of angles, the welder must hold the gun at a variety of potentially awkward angles to their body to properly align the gun with the materials to be welded thereby contributing to the fatigue of the welder.

Therefore, it is important to provide a handle for a welding gun which is relatively convenient to grasp for extended periods of time. Additionally, it is important to provide a conductor tube which may be readily articulated and rotated with respect to the handle to allow the welder to periodically change their hand and/or arm orientation with respect to the materials being welded.

In addition to reducing the efficiency of the welder by increasing the fatigue of the welder, currently available welding systems also utilize welding contact tips and gas diffusers which are referred to in the industry as consumables because they must be periodically replaced. Therefore, in addition to the cost of repeatedly replacing the contact tip and/or gas diffuser on the welding guns, there is a further cost to the employer when the welder spends time replacing contact tips and/or gas diffusers rather than producing the product.

Those skilled in the art will recognize that the welding process produces a lot of heat. In order to melt the welding wire, the arc point will sometimes reach 10,000 degrees F. (5,537 degrees C.) or more. Even though the molten pool of metal beneath the arc point is typically cooler, the molten pool of metal may reach 5,000 degree F. (2,760 degrees C.) or more. The contact tip is typically less than one inch (2.54 cm.) above the arc point and conventional contact tips may operate at temperatures of approximately 1,500 degrees F. (815 degrees C.). In the industry, contact tips are typically formed from various copper alloys which soften as the operating temperature increases. Contact tips are subject to internal wear because the welding wire is fed through the interior thereof at a time when the contact tip is softened due to elevated operating temperatures.

The present invention also increases the efficiency of the welder by providing improved contact tips and/or gas diffusers which are more durable than currently available consumable components and therefore need not be replaced as often as in prior welding systems.

SUMMARY OF THE INVENTION

An object of the present invention is to provide a handle and/or a conductor tube for a welding gun which is designed to reduce the incidence of fatigue experienced by the welder.

A further object of the present invention is to provide a contact tip and/or a gas diffuser having increased durability as compared to currently available contact tips and gas diffusers thereby reducing the material costs and down time for the welder due to the need to replace worn out contact tips and/or gas diffusers.

Yet another object of the present invention is to provide an improved spool gun having various features thereon which are particularly adapted to improve the comfort and efficiency of the welder.

Yet another object of the present invention is to provide an improved smoke gun having various features thereon which are particularly adapted to improve the comfort and efficiency of the welder.

The present invention is directed to improvements in various features which are common to welding systems in general and which are particularly suited for use on specialized MIG welding systems. These improved features include advances over currently available systems such as an improved ergonomically designed welding gun handle and trigger mechanism; an improved articulatable and rotatable conductor tube and; an improved contact tip and/or gas diffuser. These improvements may be used individually or in combination on various welding systems such as the spool guns or smoke guns described more fully below.

One of the features of the present invention relates to an improved welding gun assembly which preferably includes one or more of the following improvements: 1) the conductor tube on the forward end of the handle may be easily rotated 360 degrees about the centerline axis of the handle by the welder without resort to tools or disassembly of the gun; 2) the conductor tube may be articulated about 15 degrees up or down or side to side with respect to the longitudinal axis of the forward portion of the handle without resort to tools or disassembly of the gun, 3) the rear portion of the handle includes a gentle curve of approximately 10 degrees off the centerline of the handle to facilitate the comfortable gripping of the handle by the welder, 4) the handle includes an oval shaped upper surface and a protruding rectangular shaped lower surface to facilitate the comfortable gripping of the handle by the welder, and 5) the handle includes an elongated trigger member which allows the welder to actuate the trigger of the welding gun while gripping the handle at either the rearward, middle or forward portion thereof. The improved handle disclosed herein may be used on any of the standard 250 amp., 450 amp., or 600 amp. type of welding systems or the less commonly used 200 amp. welding system.

A further feature of the present invention relates to the use of an improved contact tip and gas diffuser. As mentioned above, because contact tips and gas diffusers are made of copper, or a copper alloy, as the welding temperature increases, the contact tip and gas diffuser become softer. The improved contact tip and gas diffuser of the present invention are formed to have a greater mass than currently available contact tips and gas diffusers. The increased mass of the contact tips and gas diffusers dissipate the heat created during the welding process better than currently available contact tips and gas diffusers. This allows the contact tips and gas diffusers of the present invention to have a lower maximum operating temperature which decreases the wear of the contact tip and gas diffuser during use. Therefore, the contact tip of the present invention has an average maximum operating temperature which is believed to be nearly one-half of the average maximum operating temperature of conventional contact tips.

Additionally, the larger mass, overall shape and interconnecting features of the contact tip and gas diffuser provide for a more efficient conduction of electricity therethrough. As described more fully below, the present invention makes contact between the gas diffuser and the contact tip at the following points: 1) along a circumferential shoulder formed on the contact tip, 2) at an area between a protrusion on the gas diffuser and a channel in the contact tip, and 3) on a line of contact between the contact tip and the gas diffuser opposite the protrusion on the gas diffuser. Therefore, the contact tip and gas diffuser preferably allow the electrical current to be conducted between the contact tip and gas diffuser in at least three distinct areas.

The increased electrical conductivity and heat dissipation of the present invention result in increased contact tip life which results in lower material costs and less down time.

An advantage of the present invention is that the contact tip and gas diffuser of the present invention are more efficient at dissipating heat and conducting electricity than currently available contact tips and gas diffusers.

Yet another advantage of the present invention is that the contact tip and gas diffuser are readily removable from the welding assembly when they do wear out thereby leading to less down time for the welder than with many of the currently available contact tips and gas diffusers.

Yet another advantage of the present invention is that the handle and conductor tube of the present invention are designed and shaped to cause less fatigue in the welder than with currently available welding systems.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is noted, however, that the appended drawings illustrate only typical embodiments of this invention and are therefore not to be considered limiting of its scope, for the invention may admit to other equally effective embodiments.

FIG. 4 is a front end view of the spool gun assembly diagrammatically showing the ability of a straight conductor tube assembly to be articulated about the longitudinal axis of the welding gun;

FIG. 5 is an elevated top view of the spool gun assembly diagrammatically showing the side to side range of articulation of a straight conductor tube assembly;

FIG. 6 is a side elevation view of the spool gun assembly diagrammatically showing the up and down range of articulation of a straight conductor tube assembly and further showing the welding wire containing spool mounted on the spool gun;

FIG. 7 is a front end view of the spool gun assembly diagrammatically showing the ability of a pre-curved conductor tube assembly to rotate 360 degrees about the longitudinal axis of the spool gun assembly;

FIG. 8 is a top elevation view of the spool gun assembly diagrammatically showing the side to side range of articulation of the pre-curved conductor tube assembly;

FIG. 9 is a side elevation view of the spool gun assembly diagrammatically showing the up and down range of articulation of the pre-curved conductor tube assembly and further showing the welding wire containing spool mounted on the spool gun assembly;

FIG. 14 is a side view of the contact tip of the present invention;

FIG. 15 is an end view of the top of the contact tip of the present invention taken generally along lines 15—15 of FIG. 14;

FIG. 16 is an enlarged side view of the gas diffuser of the present invention;

FIG. 17 is an end view of the bottom end of the gas diffuser of the present invention taken generally along lines 17—17 of FIG. 16;

FIG. 18 is a diagrammatic sketch of a smoke evacuation gun type of MIG welding gun system including the ergonomically shaped handle with an elongated trigger and the front end smoke pick-up components of the present invention;

FIG. 19 is an enlarged side view of the rear portion of the cable assembly showing the interconnection between the control cable assembly, wire feeder, trigger control leads and vacuum hose connectors of the present invention;

FIG. 20 is an enlarged side view of the rear case, cable hose, handle and smoke tube assemblies of the smoke gun system of the present invention;

FIG. 29 is an enlarged side elevation view of the contact tip of the smoke gun system of the present invention;

FIG. 30 is an enlarged view of the back end of the contact tip of the present invention taken generally along lines 30—30 of FIG. 29;

FIG. 31 is an enlarged side elevation view of the gas diffuser of the smoke gun system of the present invention;

FIG. 32 is an enlarged end view of the front end of the gas diffuser taken generally along lines 32—32 of FIG. 31;

FIG. 33 is a graph showing the relative hardness of a copper alloy at various temperatures and showing the average maximum operating temperature of the contact tip of the present invention as compared to the average maximum operating temperature of a prior art contact tip.

DESCRIPTION OF THE PREFERRED EMBODIMENTS

Figure 1:
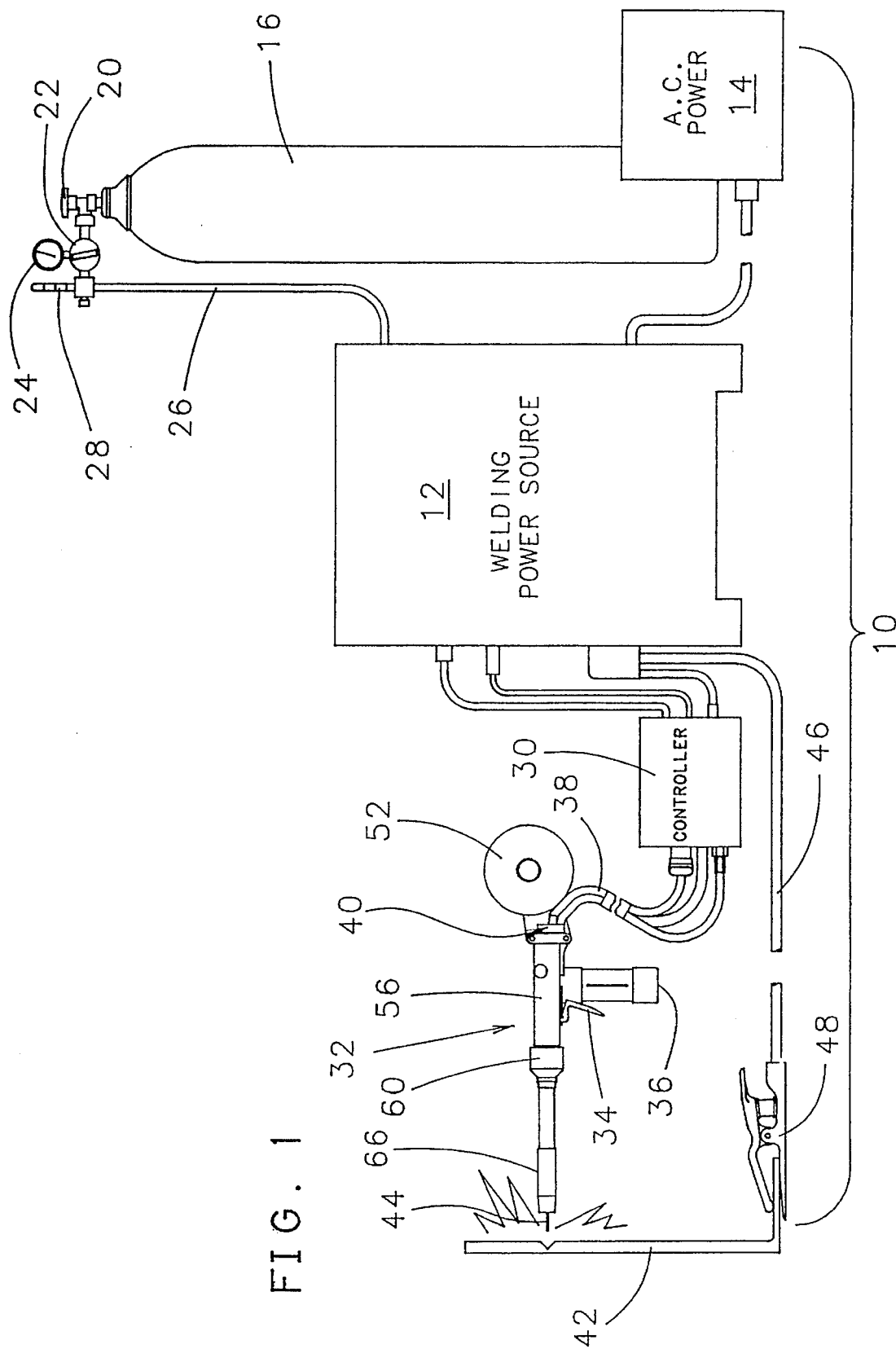
FIG. 1 is a diagrammatic sketch of a spool gun type of MIG welding system including the articulatable and rotatable conductor tube and the contact tip and gas diffuser of the present invention both of which are shown more fully in the following figures.

Referring to FIG. 1, a spool gun type of welding system is shown therein and referred to herein generally as spool gun system 10. The primary components of a MIG welding system are well known to those skilled in the art and are shown generally in FIG. 1 in so far as they are used in a spool gun system 10 of the type described in the present embodiment.

As shown in FIG. 1, the spool gun system 10 generally includes a welding power source 12 which is connected to an AC power supply 14, a high pressure gas cylinder 16 and a controller 18. The AC power supply 14 is typically a power supply of either 220 or 440 volts for most industrial applications in the United States. The gas cylinder 16 typically contains an inert gas such as argon or a combination of argon and carbon dioxide or other gases. A safety shut-off valve 20 is typically connected to the top of the gas cylinder 16 and a pressure regulator 22 is typically connected via piping to the valve 20 to reduce the pressure of the inert gas downstream thereof to about 30 psi. A pressure gauge 24 is included to provide a visual indication of the gas pressure in the gas cylinder 16. A hose 26 provides flow communication for the inert gas to the welding power source 12. A flow meter 28 is connected between the regulator 22 and the hose 26 to provide a typical flow of inert gas to the welding power source 12 of approximately 20 to 60 cubic feet per hour (560–1,700 liters per hour).

As also shown in FIG. 1, a controller 30 is connected between the welding power source 12 and the spool gun assembly 32 which is described more fully below. The controller 30 controls the flow of gas and the electrical current through the spool gun assembly 32 to the welding surface. The controller 30 regulates the flow of gas and electrical current in response to the actuation of the elongate trigger 34 and the setting of the wire feed control 36 on the spool gun assembly 32 as described below.

The control cable assembly 38 is releasably connected to a rear connection 40 on the rear end of the spool gun assembly 32 and on the other end to the controller 30.

In a typical MIG welding system, the workpiece 42 is negative and the welding wire 44 is positive. The electrical circuit for a typical MIG welding system is completed as follows: The welding power source 12 connects to a cable 46 at the end of which is a ground clamp 48. The ground clamp 48 is manually attached by the welder to the workpiece 42. An electrical arc is created between the workpiece 42 and the welding wire 44 which causes the welding wire 44 to melt into a molten pool, thus joining the plates of the workpiece 42. The electrical current is transferred to the welding wire 44 through a contact tip 50 which is discussed in greater detail hereinafter and shown in the following figures such as FIGS. 13–15. The electrical current passes from the contact tip 50 and through the spool gun assembly 32 to the controller 30 and power source 12 in the manner described more fully below.

Prior to beginning a project, the operator will typically adjust the voltage based on the workpiece and the size of the welding wire by adjusting controls (not shown) that are typically located on the welding power source 12. The operator will also adjust the amperage based on the desired rate of welding wire feed and the size of the workpiece by adjusting controls located on the wire feed control 36 or the welding power source 12.

Figure 10:
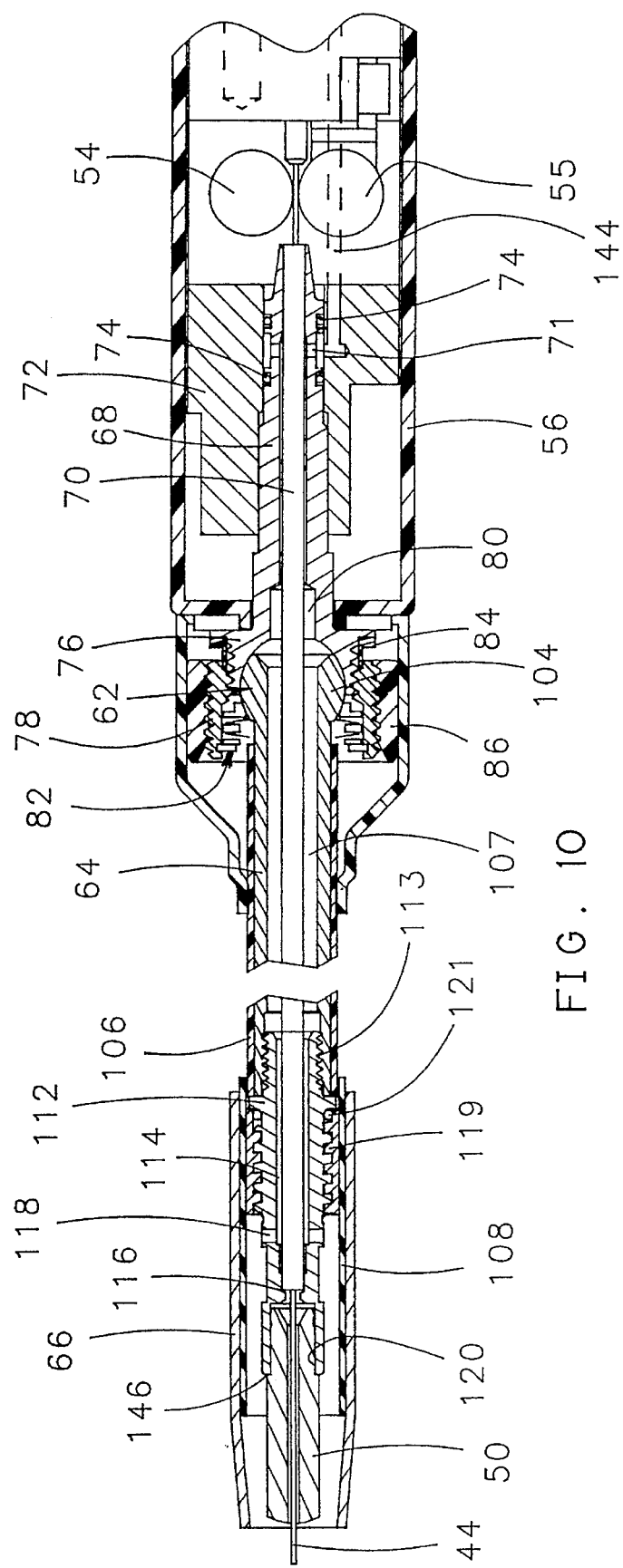
FIG. 10 is a top partial cross sectional view of the spool gun assembly showing the conductor tube assembly ball and socket joint and a portion of the handle of the present invention.

In the present embodiment, the welding wire 44 is coiled on a spool 52 which is mounted along the top rear portion of the spool gun assembly 32. The spool gun system 10 of the present embodiment preferably uses an aluminum welding wire 44 although welding wires of various metals such as copper coated, stainless steel or flux core wires may be adapted for use with the present system. The welding wire 44 is uncoiled from the spool 52 of the spool gun assembly 32 by one or more roller 54 (FIG. 10). The roller 54 pushes the welding wire 44 through the conductor tube assembly in response to the operator's actuation of the trigger 34 based on the setting of the wire feed control 36 as described more fully below.

Figures 2, 3:
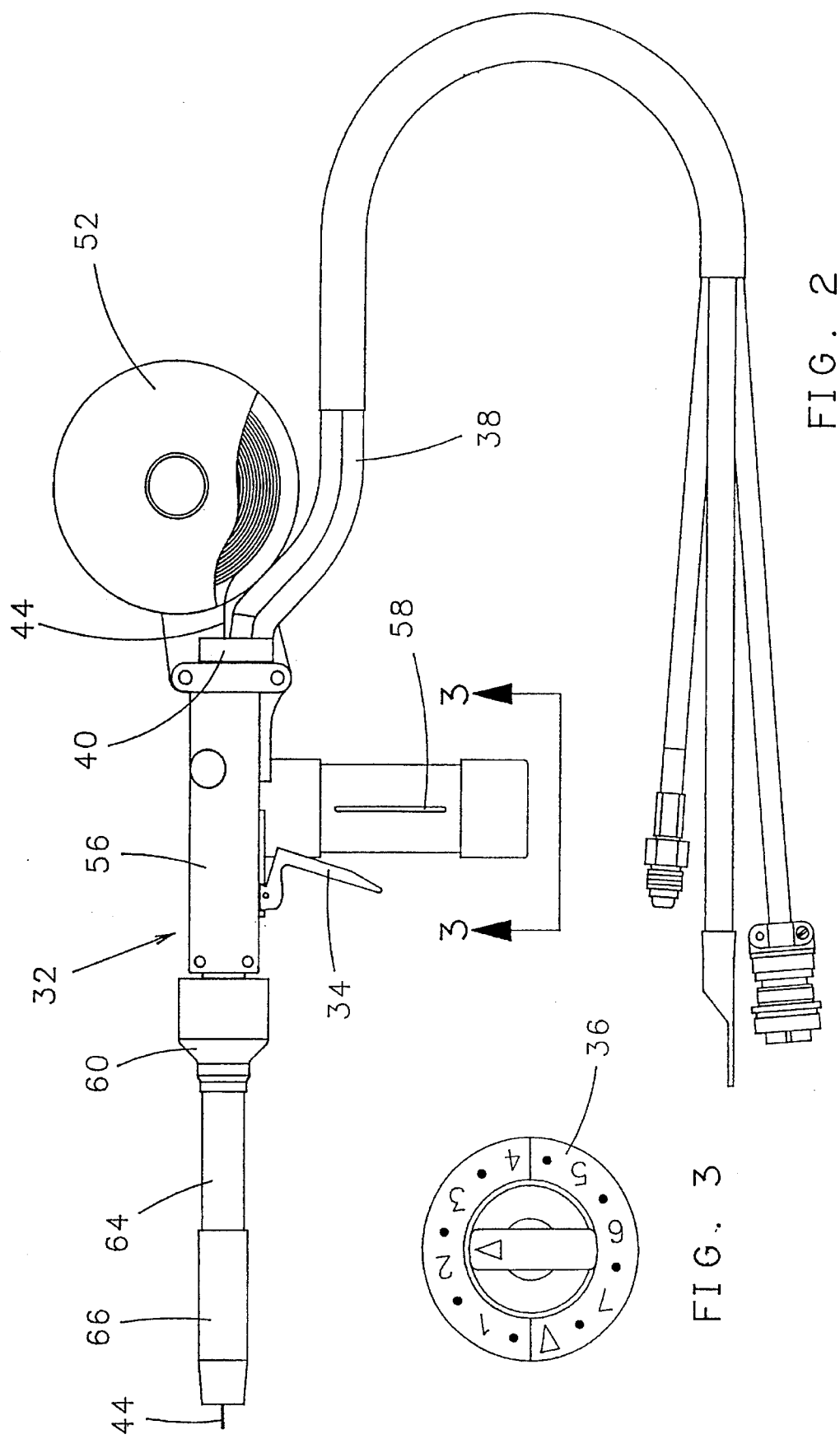
FIG. 2 is an enlarged side elevation view of the spool gun assembly as shown in FIG. 1.
FIG. 3 is bottom view showing an enlargement of the wire feed control of the spool gun assembly taken generally along lines 3—3 of FIG. 2.

FIG. 2 is an enlarged side elevation view of the spool gun system 10 of the present embodiment. The control cable assembly 38 and welding wire 44 enter the rear portion of the spool gun assembly 32 through the rear connection 40. As shown in FIG. 2, the spool gun assembly 32 generally forms a pistol grip type of handle with the wire feed control 36 extending downwardly and generally perpendicular to the handle portion 56 of the assembly. The outer surface of the wire feed control includes a plurality of ridges 58 thereon which facilitate the operator's grip of the spool gun assembly 32. The trigger 34 is an elongate member which is pivotally connected along the bottom of the handle portion 56 and extends generally along the forward side of the wire feed control 36. A flexible boot 60 extends from the forward end of the handle portion 56 to protect a ball and socket joint 62 which is discussed more fully below. The flexible boot 60 is typically formed from an elastomeric material to allow the conductor tube 64 of the spool gun assembly 32 to be readily adjusted to a number of positions which are discussed more fully hereinafter.

The conductor tube 64 is an elongate member which may be a straight (FIGS. 4–6) or pre-curved (FIGS. 7–9) tubular member. The forward portion of the conductor tube 64 receives a tubular nozzle 66 thereon and the welding wire 44 extends therebeyond after passing through the interior of the nozzle 66, conductor tube 64 and handle portion 56 of the spool gun assembly 32. As shown in FIGS. 1 and 2, the forward end of the nozzle 66 preferably includes a tapered forward portion thereon.

FIG. 3 is a bottom view of the wire feed control 36 showing the adjustability thereof. The wire feed control 36 controls the feed rate of the welding wire 44 through the spool gun assembly 32 and also the amperage applied to the contact tip 50.

FIGS. 4–6 are illustrative of the range of articulation of a straight conductor tube 64 and nozzle 66. The conductor tube 64 of the present embodiment may be articulated up to approximately 15 degrees side to side (FIG. 5) or up or down (FIG. 6) or a variation thereof (FIG. 4) in each direction with respect to the handle portion 56 of the spool gun assembly 32 without the use of tools or special procedures. This ability is particularly useful if the operator is experiencing fatigue or is unable to optimally align the contact tip 50 and welding wire 44 with the workpiece 42. The ability to articulate the conductor tube 64 with respect to the handle portion 56 of the spool gun assembly 32 enables the operator to reorient their arm or wrist to provide a different alignment with the workpiece 42 and is particularly useful in either production line or field uses of the present invention.

FIG. 7 is a front diagrammatic view of the spool gun assembly 32 of the present embodiment showing the conductor tube 64 and nozzle 66. As illustrated in this figure, the conductor tube 64 can be rotated 360 degrees about the forward portion or longitudinal axis of the spool gun assembly 32. Rotation of the conductor tube 64 may be quickly accomplished manually by the operator without resort to the use of tools or special procedures. This feature of the present embodiment is useful for both production line and field operations to reduce fatigue and ensure access to the workpiece 42. If a production line welder is experiencing fatigue from having to repeatedly weld a product in a certain angular position, they may easily and quickly rotate the conductor tube 64 in one direction or another to alter their arm or wrist orientation. Similarly, if a welder working in the field is having difficulty accessing a workpiece 42 or is fatigued from welding at an awkward angle, they may rotate the conductor tube 64 in one direction or another to provide easier access to the workpiece 42 or temporarily decrease their fatigue by altering their arm or wrist orientation.

FIGS. 6 and 9 also illustrate the relative orientation and size of the spool 52 which is mounted on the rear end of the spool gun assembly 32. As described above, the spool 52 contains the welding wire 44 thereon. A spool gun system 10 preferably includes control cable assembly 38 which may be about 25 feet long rather than the 10–15 foot long cable used in various other MIG welding systems. This increase in length of the control cable assembly 38 greatly increases the resistance encountered by the welding wire 44 if it were threaded through the control cable assembly 38 as in many other MIG type welding systems. Therefore, a more preferable approach is to mount a smaller spool 52 of welding wire 44 on the rear end of the spool gun assembly 32 as shown in the present embodiment.

FIGS. 8 and 9 better illustrate the benefits of being able to articulate the conductor tube 64 and nozzle 66, particularly with a pre-curved conductor tube 64. The articulation of the conductor tube 64 about the handle portion 56 without the need for tools, allows the operator to quickly and easily adjust the conductor tube 64 to relieve fatigue or to obtain the optimum orientation between the workpiece 42 and the contact tip 50.

Figure 11:
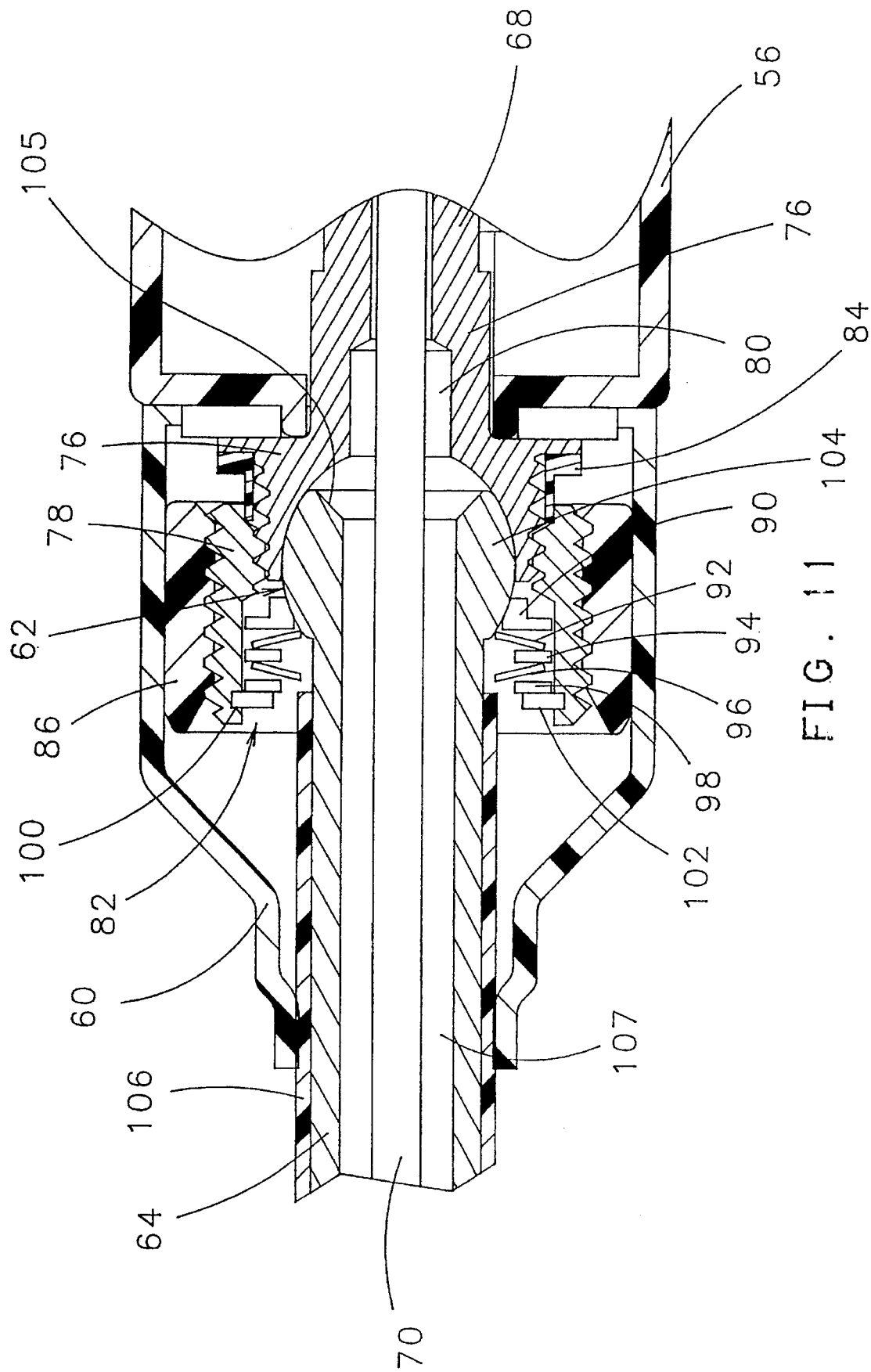
FIG. 11 is an enlarged top partial cross sectional view of the spool gun assembly further showing the ball and socket joint of the present invention.

FIGS. 10 and 11 are enlarged top cross sectional diagrammatical views of the spool gun assembly 32 of the present embodiment with particular emphasis on the details of the ball and socket joint 62 that enables the convenient rotation and articulation of the conductor tube 64 and nozzle 66 about the forward handle portion 56 of the spool gun assembly 32. As shown in FIG. 10, the rear portion of the spool gun assembly 32 includes a roller 54 and idler 55 therein. The roller 54 and idler 55 grip the welding wire 44 and push the welding wire 44 through the adaptor plug 68 and into the welding wire conduit 70. The adaptor plug 68 includes an opening 71 in the rear end thereof to allow the inert gas from the gas cylinder 16 to flow through an annular passage 80 therein as described more fully below. The elongate conduit 70 is preferably formed from extruded teflon and serves as a conduit for the welding wire 44 between the roller 54 and idler 55 and the contact tip 50 in the spool gun assembly 32. Alternately, the conduit 70 may be constructed of a helically wound metal wire, as shown in FIGS. 18–32, or other suitable material to protect the welding wire 44 from kinking while providing a minimum of frictional resistance for the passage of the welding wire 44 therethrough. A conductive housing 72 is located in the handle portion 56 of the spool gun assembly 32 to fixedly retain the adaptor plug 68 in position with respect to the sidewalls of the handle portion 56 in the spool gun assembly 32. A pair of O-Rings 74 are preferably used to form a seal between the adaptor plug 68 and the housing 72 to prevent the flow of gas therebetween while allowing the flow of gas into the opening 71. The outer diameter of the adaptor plug 68 includes stepped increases in diameter from the rear portion to the forward portion thereof to allow the adaptor plug 68 to be inserted into the forward end of the handle portion 56 during the assembly of the spool gun assembly 32. The forward end of the forward section 76 of the adaptor plug 68 includes a surface thereon which contacts the forward side of the handle portion 56 to limit the movement of the adaptor plug 68 into the handle portion 56. The outer surface of the forward section 76 of the adaptor plug 68 is also threaded to receive a threaded collet 78 from the conductor tube 64 thereon. The forward section 76 of the adaptor plug 68 also includes a spherical surface therein which provides a seat for the ball end 104 of the conductor tube 64 to form the ball and socket joint 62.

Figure 12:
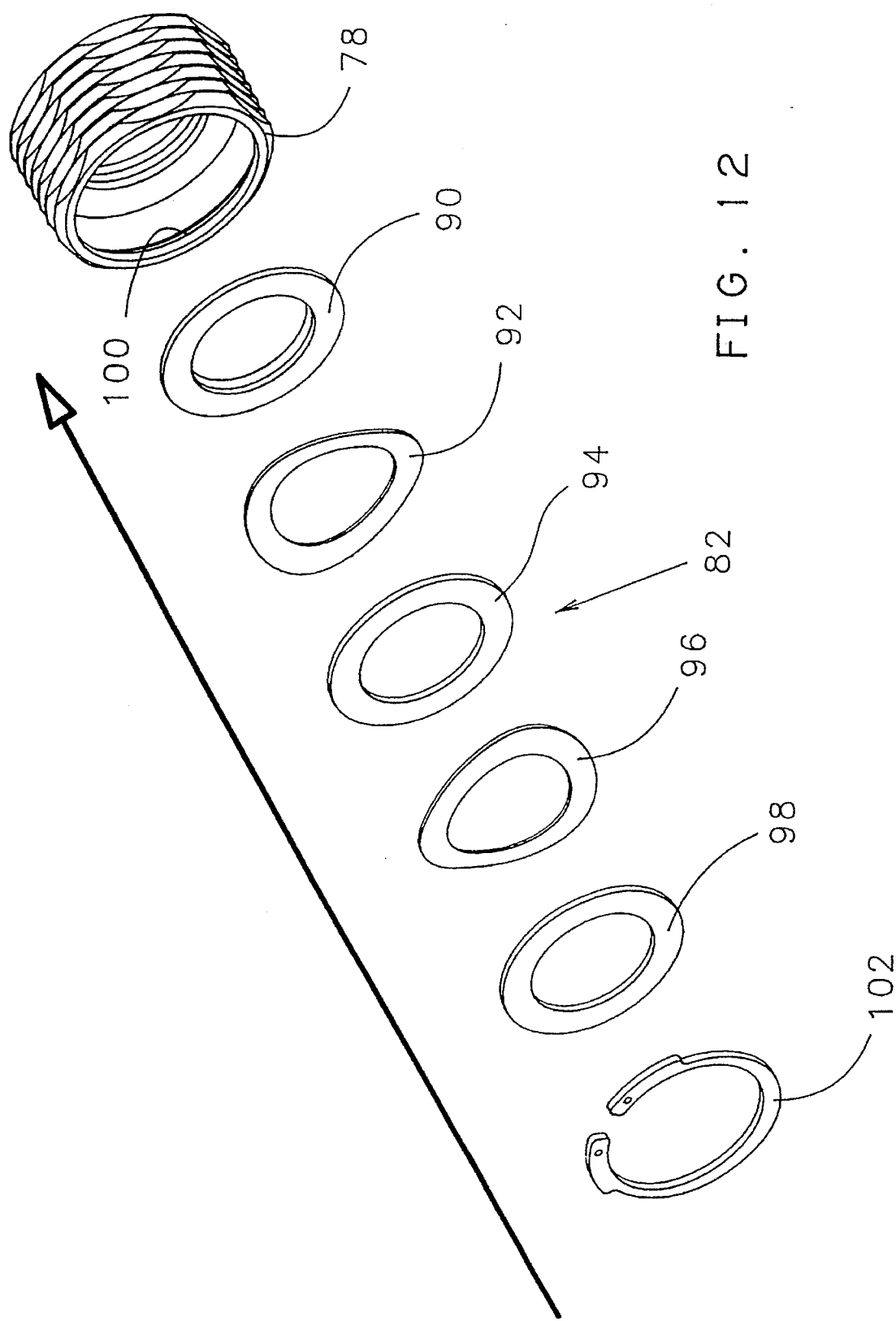
FIG. 12 is an exploded side view of the wave washer assembly for the ball and socket joint as shown in FIGS. 10 and 11.

The adaptor plug 68 is further removably connected to the conductor tube 64 by a wave washer assembly 82, which generally includes the threaded collet 78, a lock ring 84 which is preferably constructed of nylon to prevent the threaded collet 78 from working loose of the forward section 76 of the adaptor plug 68, a rigid spacer 86 on the exterior of the threaded collet 78 and an internal washer assembly 82 which is shown in an exploded view in FIG. 12. The internal washer assembly 82 is preferably fully received in the interior of the threaded collet 78 and includes a follower 90, a first wave washer 92, a first flat washer 94, a second wave washer 96 and a second flat washer 98. A channel 100 in the forward end of the threaded collet 78 receives a split retaining ring 102 therein to retain the internal washer assembly 82 therein.

The rear end of the conductor tube 64 is a generally bulbous-shaped member 104 which forms the ball portion of the ball and socket joint 62. The bulbous-shaped member 104 is sized and arranged to articulate and rotate in the spherical portion of the forward section 76 of the adaptor plug 68. The bulbous-shaped member 104 includes a chamfered surface 105 which surrounds the annular passage 107 therein to prevent the conductor tube 64 from binding the conduit 70 in the annular passage 80 of the adapter plug 68 during articulation or rotation of the conductor tube 64. The wave washer assembly 82 functions as a means for applying pressure to the bulbous-shaped member 104 and the spherical portion of the adaptor plug 68. The wave washer assembly 82 is also sized to allow the conductor tube 64 to rotate 360 degrees about the centerline of the handle portion 56 and to articulate up to approximately 15 degrees or more in a conical area extending from the forward section 76 of the adaptor plug 68 without binding or kinking the welding wire 44 and without requiring the use of tools to manipulate the conductor tube 64.

The outer surface of the conductor tube 64 includes an outer insulating surface 106 thereon which extends from a location a short distance forwardly of the bulbous shaped member 104 to the forward end of the conductor tube 64. As shown best in FIG. 13, the nozzle 66 is threaded onto the middle portion of the gas diffuser 112. The interior surface of the nozzle 66 includes an insulating component 108 which is crimped between the nozzle 66 and the threaded insert 119. The insulating component 108 of the nozzle 66 is sized to closely fit over at least a portion of the insulating surface 106 of the conductor tube 64 so that in combination with the flexible boot 60, insulating surfaces are present over all of the exposed spool gun assembly 32 components between the handle portion 56 and the nozzle 66.

Figure 13:
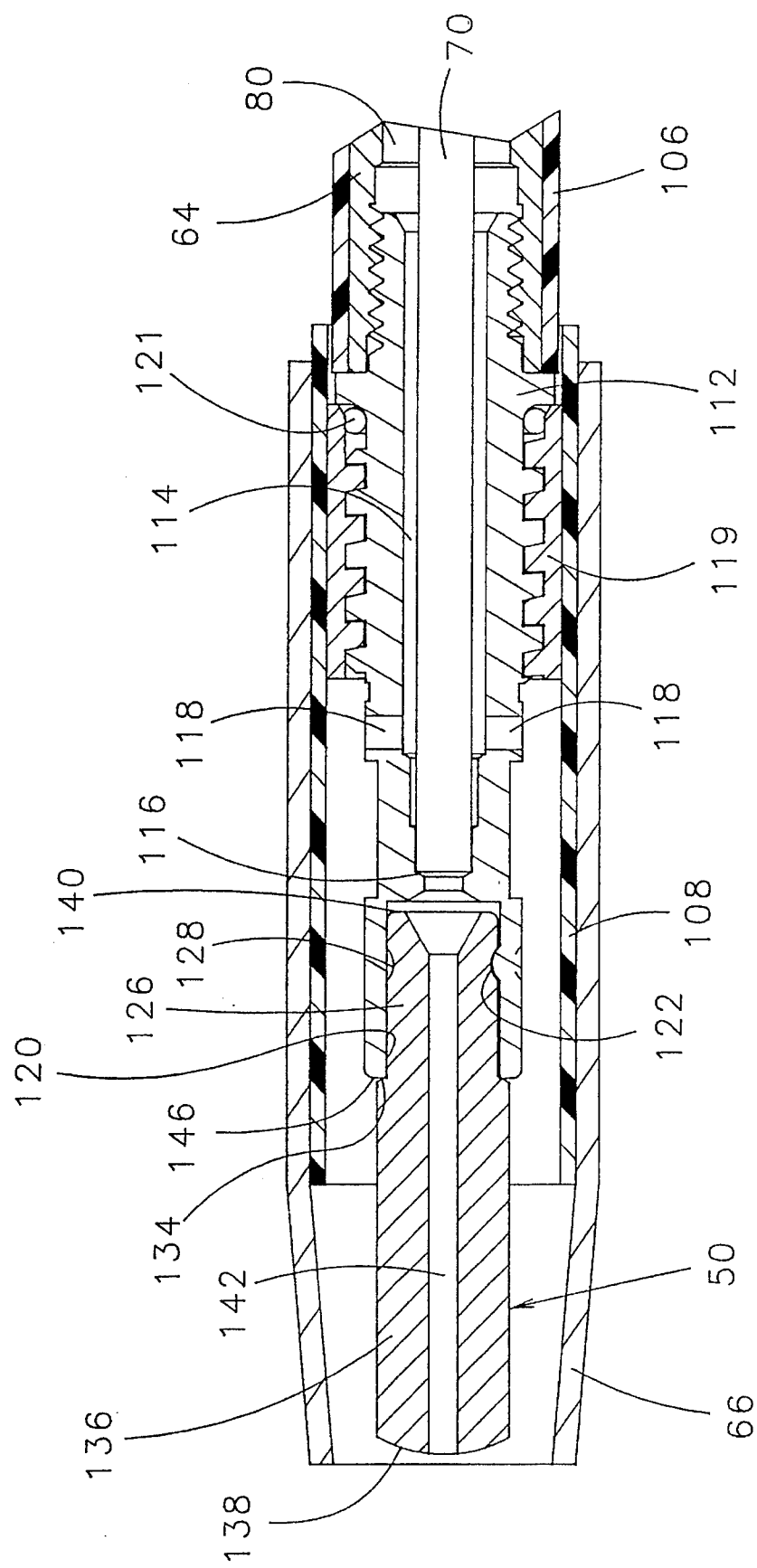
FIG. 13 is an enlarged top cross sectional view of the conductor tube assembly of the spool gun assembly showing the consumable contact tip and gas diffuser of the present invention in greater detail.

The gas diffuser 112 is formed of a conductive material and is threaded into the interior of the forward portion of the conductor tube 64. The interior of the gas diffuser 112 includes an annular passage 114 to receive the welding wire 44 therethrough and the conduit 70 substantially therethrough. As shown in FIGS. 10 and 13, the forward end of the conduit 70 abuts against a shoulder surface 116 in the annular passage 114 of the gas diffuser 112. The annular passage 114 of the gas diffuser 112 is axially aligned with the annular passage 80 of the conductor tube 64 and includes a diameter which is smaller than the diameter of the annular passage 80 and decreases further in diameter at the shoulder surface 116 to a diameter which is nearly identical to the outer diameter of the conduit 70. Therefore, if it is necessary for any reason for the operator to replace the conduit 70 because it is clogged or somehow becomes kinked, the operator may slide the flexible boot 60 forwardly along the conductor tube 64 and then unthread the wave washer assembly 82 from the adaptor plug 68 to expose the conduit 70. Alternatively, the operator may remove the nozzle 66 from the gas diffuser 112 and then unthread the gas diffuser 112 from the forward end of the conductor tube 64 to expose the forward end of the conduit 70 to allow for the simple replacement of the conduit 70.

The forward end of the annular passage 114 on the gas diffuser intersects a plurality of ports 118 which are located immediately rearward of the shoulder surface 116. The ports 118 are preferably drilled into the gas diffuser 112 to extend radially through the sidewalls of the gas diffuser 112. In the preferred form of the present invention, six ports 118 are present although more or less may be used depending on whether or not the operator needs a more diffuse flow of inert gas to the workpiece 42 or if a more selective flow of inert gas is desired. As shown in FIG. 17, a wrench flat 110 is located forwardly of the ports 118 in the gas diffuser 112. The wrench flat 110 is sized to form a passage which receives a wrench (not shown) therein to assist in the installation of the gas diffuser 112 on the forward portion of the conductor tube 64.

As shown best in FIGS. 16 and 17, the forward end of the gas diffuser 112 includes an enlarged diameter chamber 120 therein which is sized to snugly receive the rear portion of the contact tip 50 therein. A protrusion 122 extends inwardly into the enlarged diameter chamber 120 at a location approximately two-thirds of the distance along the enlarged diameter chamber 120. Although the protrusion is preferably rectangularly shaped because it is preferably formed by a punch on the side of the gas diffuser 112, nearly any other shape will suffice as long as it satisfactorily contacts the contact tip 50 in the manner described below. The exterior surface of the gas diffuser 112 preferably includes a threaded portion 113 on the rear end thereof. The threaded portion 113 is sized to be received in the forward end of the conductor tube 64. A larger diameter lip 115 is located forwardly of the threaded portion 113 and is sized to contact the forward end of the conductor tube 64 as shown in FIG. 13. An approximately square thread 117 is formed forwardly of the lip 115 and, in this embodiment, is sized to receive a threaded insert 119 thereon. The portion of the gas diffuser 112 which is located forwardly of the thread 117 is sized to be spaced apart from the interior surface of the insulating component 108 and the nozzle 66. As shown in FIG. 16, an O-ring 121 is preferably located between the lip 115 and thread 117 on the gas diffuser 112.

The gas diffusers 112 of the present embodiment are preferably available in two primary sizes and weights which are used in the three most common amperage MIG welding systems. For example, a gas diffuser 112 in accordance with the present invention will preferably weigh about 42 grams in a 250 amp. MIG welding system and between about 59 to 64 grams in a 450 or 600 amp. MIG welding system. The gas diffuser 112 of the present invention is also approximately 6.3 cm. long in a 450 or 600 amp. MIG welding system and somewhat shorter in a 250 amp. MIG welding system, as described more fully below. In addition to the 250, 450 or 600 amp. MIG welding system, a 200 amp. or less MIG welding system is used in Europe and occasionally in the United States. The gas diffuser 112 of the present invention for use in the 200 amp. or less MIG welding system weighs slightly less and is shorter than the gas diffuser 112 used in the 250 amp. MIG welding system. As a point of reference for the relative size and weight of the gas diffuser 112 of the present invention, the prior art gas diffusers previously sold by the assignee of the present invention weighed about 14 grams or about one-third to one-fourth or more of the weight of the gas diffusers 112 of the present invention.

As shown in FIGS. 14 and 15, the contact tip 50 of the present invention is an elongate and generally cylindrical member. Applicant has successfully used a copper alloy containing approximately 99.8 percent copper and approximately 0.2 percent phosphorous for the contact tip 50. Those skilled in the art will recognize that other alloys may also be suitable for this application.

An important feature of the contact tip 50 of the present invention relates to the absence of threads on the exterior surface of the contact tip 50. Those skilled in the art will recognize that it is desirable to have threadless contact tips so that the contact tip 50 may be quickly and easily removed from the gas diffuser 112. Additionally, weld spatter will sometimes interfere or obstruct the threads on a conventional contact tip to make the removal of the contact tip extremely difficult. This results in increased down time for the operator. In order to overcome this difficulty, the contact tip of the present invention includes a flat surface 124 formed tangentially with respect to the longitudinal axis of the contact tip 50 along the reduced diameter rear portion 126 of the otherwise generally cylindrical contact tip 50. The flat surface 124 allows the user to freely slip the rear portion 126 of the contact tip 50 into the enlarged diameter chamber 120 of the gas diffuser 112 without interference from the protrusion 122.

The flat surface 124 extends forwardly along the rear portion 126 of the contact tip 50 into a channel 128 which extends circumferentially along the contact tip 50 rearwardly of the mid point of the rear portion 126. The channel 128 is formed by a rear edge 130 and a forward edge 132 which are preferably oriented in a non-parallel manner with respect to each other so that the channel 128 is formed having a maximum width generally aligned with or adjacent to the flat surface 124 and a minimum width on the surface of the contact tip 50 opposite to the flat surface 124. Additionally, the channel 128 of the contact tip 50 preferably includes a varied depth wherein the maximum depth of the channel is preferably adjacent to the flat surface 124 and the minimum depth is preferably located on the surface of the contact tip 50 located opposite to the flat surface 124.

The contact tip 50 of the present invention preferably includes a circumferential shoulder 134 thereon which is preferably located at less than about one-third of the length of the contact tip 50. The circumferential shoulder 134 separates the rear portion 126 of the contact tip 50 from the larger diameter and generally cylindrical forward portion 136 of the contact tip 50. The forward end 138 of the contact tip is preferably rounded as compared to the preferably flat rear end 140 of the contact tip 50.

As shown in FIGS. 10 and 13–15, the contact tip 50 preferably includes an annular passage 142 extending the length of the contact tip 50. The annular passage 142 has a diameter which is significantly less than the annular passage 114 of the gas diffuser 112 and is only slightly larger than the diameter of the desired welding wire 44. Additionally, the rear portion of the annular passage 142 is preferably chamfered to facilitate the insertion of the welding wire 44 therethrough during replacement of the contact tip 50 whenever this is necessary.

As described above with respect to the gas diffuser 112 of the present invention, the contact tip 50 is also significantly heavier than prior art contact tips previously manufactured by the assignee of the present invention. The contact tip 50 of the present invention preferably weighs about 14 or 15 grams for use in 250, 450 or 600 amp. MIG welding systems. This weight is approximately twice the weight of the prior art contact tips manufactured by the assignee of the present invention. Additionally, the contact tip 50 of the present invention is preferably about 3.8 cm. long and has an outside diameter of approximately 1.0 cm. on the forward portion 136 thereof.

The modified contact tip 50 and gas diffuser 112 for use in a 200 amp. or less MIG welding system also provide the advantages of increased heat dissipation and electrical conductivity for the contact tips 50 and gas diffusers 112 which are used on the 250, 450 or 600 amp. MIG welding systems as described herein. The modified contact tip 50 for use on a 200 amp. or less MIG welding system preferably weighs about 7 or 7.5 grams while the gas diffuser 112 weighs about 40 grams which is nearly the same as the approximately 42 gram gas diffuser 112 which is used in the 250 amp. MIG welding system. The modified contact tip is also preferably shorter and has a smaller diameter than the contact tips 50 described above with respect to the conventional 250, 450 or 600 amp. MIG welding systems. In the presently preferred form of the modified contact tip 50, the diameter is approximately about 0.283 inches as compared to approximately 0.343 inches for the diameter of the larger contact tips 50 of the present invention as described above. Additionally, the length of the modified contact tip 50 is reduced from the approximately 1½ inch length described above to about 1 inch for the modified contact tip 50. These modifications are desired, at least in part, because of the preference for using a smaller diameter nozzle 66 in a 200 amp. or less MIG welding system. Even with the modifications to the contact tip 50 described above, the comparative size of the modified contact tip and gas diffuser for use in a 200 amp. or less MIG welding system of the present invention as compared to a conventional contact tip and gas diffuser for use in a 200 amp. or less MIG welding system provide significantly better heat dissipation and electrical conductivity characteristics. Therefore, the modified contact tip 50 and gas diffuser 112 for use in a 200 amp. or less MIG welding system have a significantly lower average maximum operating temperature than is available with conventional contact tips and gas diffusers which are designed for use in 200 amp. or less MIG welding systems.

In order to more fully understand and appreciate the spool gun system 10 and the features of the present invention, the following description of the flow of the inert gas and the conduction of the electricity through the spool gun system 10 is provided and reference should be made to the various figures described above.

When the trigger 34 of the spool gun assembly 32 is actuated by the operator; the flow of inert gas, welding wire 44 and electrical current are actuated and directed to the workpiece 42. The inert gas flows from the gas cylinder 16 past the valve 20 and pressure regulator 22 and through the hose 26 to the welding power source 12. The inert gas flows from the welding power source 12, through the controller 30 to the rear connection 40 on the spool gun assembly 32. As shown generally in FIG. 10, the inert gas then flows into a rear gas passage 144 which is located in the rear of the handle portion 56 of the spool gun assembly 32. The inert gas flows from the rear gas passage 144 into the opening 71 in the rear end of the adaptor 68 and around the conduit 70 in the adaptor plug 68 through the annular passage 80. The inert gas then flows from the annular passage 80 of the adaptor plug 68 into the annular passage 107 of the conductor tube 64 and to the annular passage 114 of the gas diffuser 112. As the inert gas reaches the shoulder surface 116 of the annular passage 114 in the gas diffuser 112, the majority of the inert gas is forced outwardly from the gas diffuser 112 through the equally spaced apart ports 118. The inert gas then flows through the interior of the nozzle 66 and forms a region of shielding gas around the contact tip 50 which then blankets with inert gas the molten puddle developed by the welding arc between the welding wire 44 and the workpiece 42.

As described generally above, the spool gun system 10 forms an electrical circuit which is completed between the contact tip 50 and welding wire 44 and the workpiece 42. The electrical current initially flows from the A.C. power supply 14 to the welding power source 12. The current flows from the welding power source 12, through the controller 30 through the control cable assembly 38 and to the rear connection 40 on the spool gun 32. The current then flows through the adaptor plug 68 and conductor tube 64 and then into the gas diffuser 112.

In an important feature of the present invention, the current then flows from the gas diffuser 112 to the contact tip 50 through three areas of contact which improve the conduction of the current therethrough and the dissipation of heat therefrom. The first area of contact between the gas diffuser 112 and the contact tip 50 is between the protrusion 122 on the gas diffuser 112 and the channel 128 on the contact tip 50. In the present invention, the first contact area is created by inserting the contact tip 50 into the gas diffuser 112 as described above by aligning the flat surface 124 on the contact tip 50 with the protrusion 122 in the gas diffuser 112. The contact tip 50 is then rotated approximately one-quarter turn so that the protrusion 122 contacts the rear edge 130 of the channel 128 as well as the interior of the channel 128 due to the reduced depth of the channel 128 in this area.

The second area of contact between the contact tip 50 and the gas diffuser 112 is between the circumferential shoulder 134 on the contact tip 50 and the forward end 146 of the gas diffuser 112. The second area of contact is the result of the cam action during the rotation of the contact tip 50 onto the protrusion 122 of the gas diffuser 112. The third area of contact between the contact tip 50 and the gas diffuser 112 is formed along a line on the interior of the gas diffuser 112 opposite the protrusion 122 and along a line on the rear portion 126 of the contact tip 50 opposite the first area of contact between the protrusion 122 and the channel 128. This third contact area is created as the protrusion 122 encounters the decreasing depth of the channel 128 which pushes the rear portion 126 of the contact tip against the side of the gas diffuser 112.

Finally, the current passes from the contact tip 50 to the welding wire 44 and as the wire 44 contacts the workpiece 42 an arc is formed which completes the electrical circuit and melts the welding wire 44.

In this embodiment, the welding wire 44 is mounted on a spool 52 located at the rear of the spool gun assembly 32. As discussed briefly above, because the spool gun assembly 32 typically includes control wires or cables which are significantly longer than the control wires or cables used in conventional MIG welding systems, the resistance created by pushing or pulling the welding wire 44 through the longer cable would require the use of one or more motors. A first motor may be located on the welding power source adjacent to the spool of wire and a second motor may be located on the handle of the welding gun to overcome the resistance to the movement of the welding wire through the MIG welding system. Alternately and preferably, a single smaller motor may be mounted on the spool gun assembly 32 adjacent to the spool 52 of welding wire 44 as disclosed in the present embodiment. In this embodiment, the motor is contained in the lower extension of the spool gun assembly 32 which has previously been identified as the wire feed control 36.

The welding wire 44 is uncoiled from the spool 52 by the roller 54 contained in the body portion 56 of the spool gun assembly 32. The roller 54 and idler 55 are sized to grip the welding wire 44 as they are rotated by the motor. The roller 54 then pushes the welding wire 44 through the preferably teflon conduit 70 which extends through the annular passages of the adaptor plug 68 and conductor tube 64 and into the annular passage of the gas diffuser 112. The welding wire 44 is then pushed beyond the forward end of the conduit 70 and through the annular passage 142 in the contact tip 50.

As best shown graphically in FIG. 33, the increased mass of the gas diffuser 112 and contact tip 50 of the present invention as well as the presence of the improved contact areas to conduct current and dissipate heat therebetween to significantly reduce the average maximum operating temperature of the 14 or 15 gram contact tip 50 of the present invention as compared to prior art contact tips manufactured by the assignee of the present invention. As shown in FIG. 33, the average maximum operating temperature of the contact tip 50 of the present invention is approximately 875 degrees F. (468 degrees C.) as compared to an average maximum operating temperature of approximately 1,475 degrees F. (806 degrees C.) for the prior art contact tips. Therefore, the contact tip 50 of the present invention has an average maximum operating temperature which is nearly one-half that of the prior art contact tips manufactured by the assignee of the present invention.

The reduction in average maximum operating temperature is believed to be particularly important in the present invention wherein the contact tip 50 is made from a copper alloy which softens as the operating temperature increases. This increased softness of the contact tip 50 is undesirable because the welding wire 44 will wear out the softer contact tip more quickly than the contact tip 50 of the present invention and therefore will require the replacement of the prior art contact tip more often than with the contact tip 50 of the present invention. As shown in FIG. 33, the Brinell hardness of the contact tip 50 in use is approximately 70 or nearly four times that of the prior art contact tip.

FIGS. 18–32 are illustrative of a further preferred embodiment of the present invention wherein the features of the present invention are illustrated in use on a smoke evacuation gun or smoke gun type of welding system 150. For the sake of brevity, elements and features which are common to the spool gun welding system 10 described above and the smoke gun welding system 150 described below are not separately discussed or numbered herein and like numbers have been added to like elements to more clearly identify the common elements of these preferred embodiments of the present invention.

As shown in FIG. 18, the smoke gun welding system 150, includes a welding power source 12, an A.C. power supply 14 and a gas cylinder 16 with all of the associated valves and connections. Additionally, the preferred form of the present embodiment also includes a vacuum source 152 which includes an elongated vacuum hose 154 connected between the vacuum system 152 and a quick disconnect rear connector assembly 174 on the smoke gun cable hose 156. The wire containing spool 158 of the present embodiment is mounted on the welding power source 12 adjacent to the roller 54.

The smoke gun assembly 160 is connected to the forward end 162 of the cable hose 156 and includes a curved handle 188 having a vacuum control 166 and an elongated trigger 168 thereon. A smoke tube 272, smoke nozzle 206 and welding nozzle 172 form the forward portion of the smoke gun assembly 160.

As shown in FIG. 19, the rear connector assembly 174 is located between the cable hose 156 and the wire feeder which is part of the power source 12 and operatively connects the welding wire 44, the inert gas, the electrical welding current and the vacuum from the vacuum source 152 with the cable hose 156 for passage to the smoke gun assembly 160. The rear connector assembly 174 includes a Y-connector 176 which includes a side opening for the transfer of the vacuum from the cable hose 156 to the vacuum source 152. An electrical connector 178 is positioned on the top surface of the rear case 180 to provide electrical connection to the trigger 168. The rear connector assembly 174 also includes a rear connector plug 179 which conducts the welding electrical current and receives the welding wire 44 and the inert gas therethrough. The rear connector assembly 174 is designed to be threadedly received on the rear end 182 of the cable hose 156 by a rear sleeve 184 which is threaded over the rear connector assembly 174 to provide a connection which may be readily connected to or disconnected from the welding power source 12 as described in more detail in connection with FIG. 23.

Figure 22:
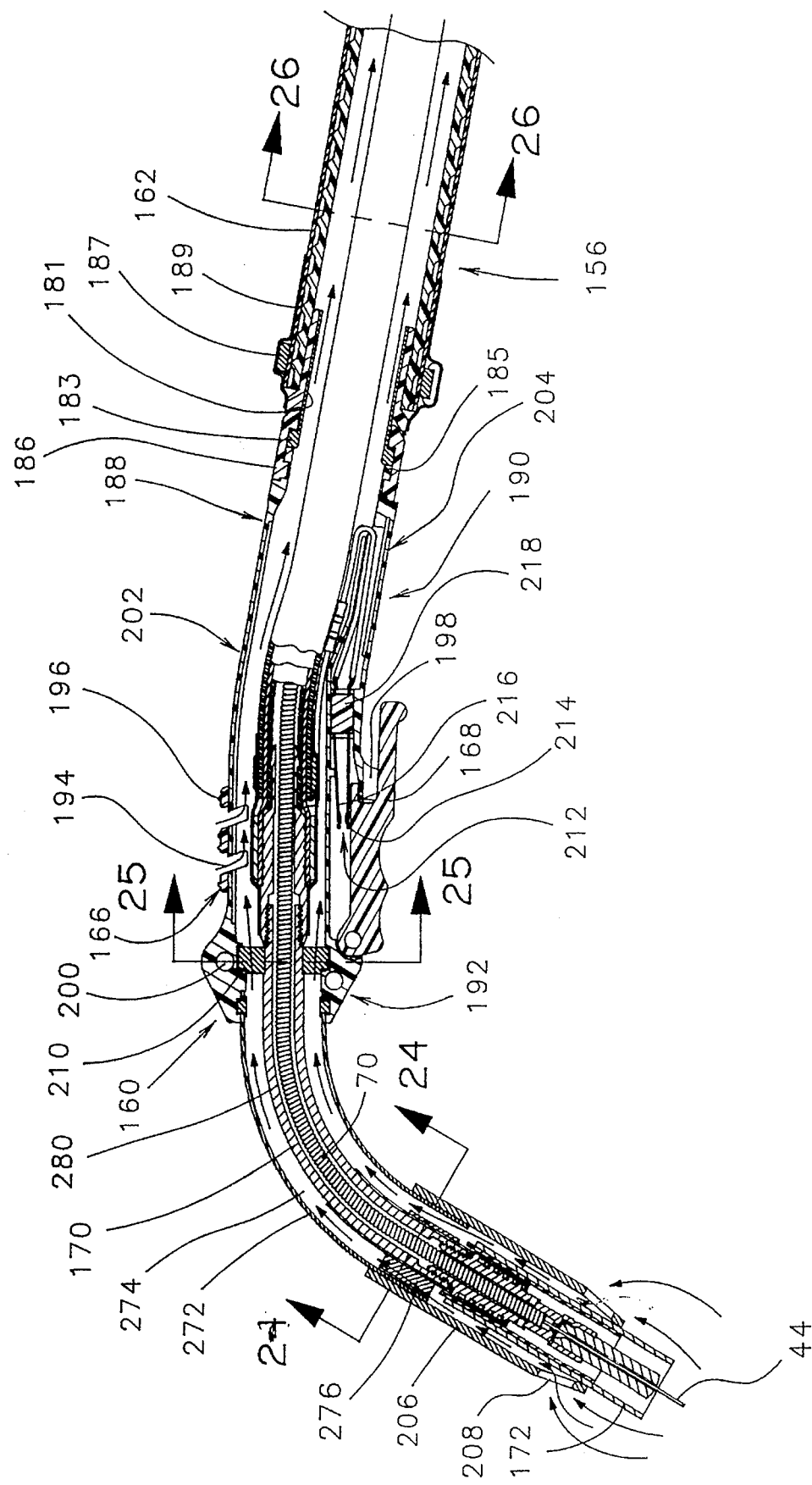
FIG. 22 is an enlarged side cross sectional view of the smoke tube assembly, handle and a portion of the cable hose assembly of the smoke gun system of the present invention.

As shown in FIG. 22, the smoke gun assembly 160 and cable hose 156 of this embodiment form a self contained and flexible extension of the welding system. The forward end 162 of the cable hose 156 includes a connector sleeve 186 which is received on the rear end of the smoke gun assembly 160.

The forward end 162 of the cable hose 156 extends over a circumferential connector sleeve 181 which reduces the flexing of the cable hose 156 at the connection with the rear end of the smoke gun assembly 160. The circumferential connector sleeve 181 includes an outwardly extending circumferential flange 183 which engages a channel 185 in the rear interior surface of the connector sleeve 186 thereby preventing the circumferential connector sleeve 181 from separating therefrom. The cable hose 156 and the connector sleeve 186 are further interconnected by a circumferential clamp 187 which surrounds the cable hose 156 and is further enclosed by a protective flexible cover 189.

The handle 188 of the smoke gun assembly 160, as shown in FIG. 20 includes a rear portion 190 which is curved downward at an angle of approximately 10 degrees off the centerline of the forward portion 192 of the handle 188 to make the handle 188 more comfortable for the operator to hold. The forward portion 192 of the handle 188 includes a vacuum control assembly 166 thereon which consists of one or more openings 194 in the handle 188 and a finger actuatable slide member 196 which is movable over the openings 194 to allow the operator to easily increase or decrease the amount of vacuum applied at the forward end of the smoke gun assembly 160 as described more fully below. The bottom surface of the forward portion 192 includes the elongated trigger 168 pivotally mounted near the front end thereof. The trigger 168 extends approximately one-half of the distance of the handle 188. A trigger guard 198 protrudes from the lower surface of the handle 188 on both sides of the trigger 168 located approximately two-thirds of the length of the trigger 168 and is designed to reduce the risk of unintentional actuation of the trigger 168. In use, the operator may hold the handle 188 by the rear portion 190 thereof and actuate the portion of the trigger 168 which extends rearwardly of the trigger guard 198. The operator may alternately grip the handle 188 along the middle or forward portion 192 thereof and actuate the portion of the trigger 168 which is positioned forwardly of the trigger guard 198. The trigger 168 is designed so that it will complement the contours of the operator's hand and may be actuated by the operator from a variety of hand positions along the handle 188.

Figure 21:
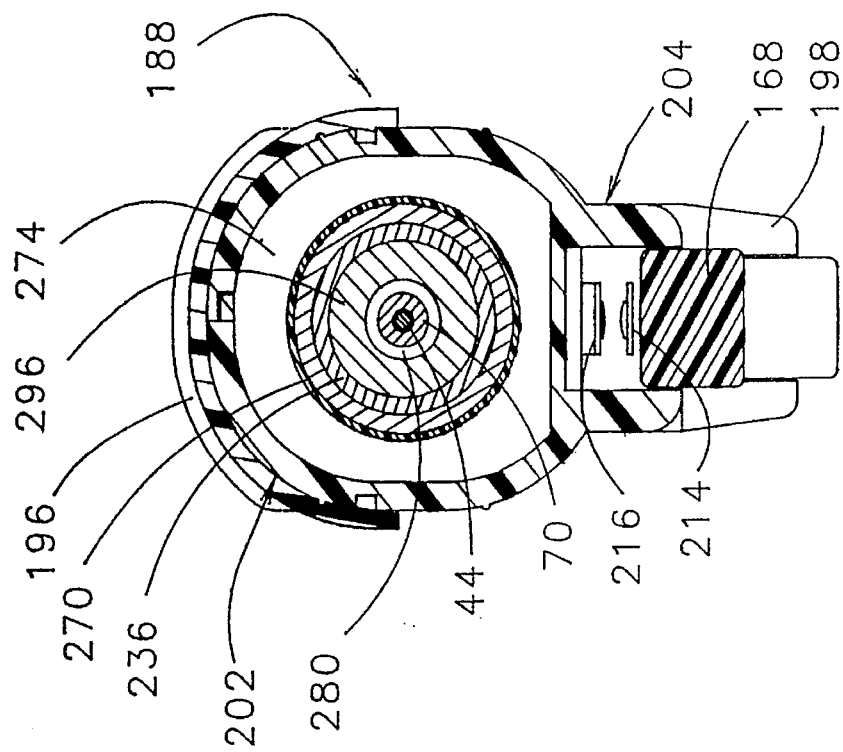
FIG. 21 is an enlarged cross-sectional view of the handle assembly taken generally along lines 21—21 of FIG. 20.

The handle 188 of the present embodiment, is preferably injection molded into two halves which are held together by screws 200 or other suitable fastening means. The upper surface 202 of the handle 188 is preferably a generally oval shape while the lower surface 204 protrudes from the handle 188 and is generally rectangularly shaped to provide a gripping surface for the fingers of the operator as shown in FIG. 21.

The conductor tube 170 of the present embodiment is shown as a standard precurved elongate tube which is manufactured of a conductive material and which is shown as being non-articulatable or rotatable as compared to the prior embodiment described above. The welding nozzle 172 of the present embodiment is shown in a modified form to include a smoke nozzle 206 which has a plurality of elongated and angled openings 208 thereon to draw the smoke created during the welding process therein as described more fully below.

Figure 26:
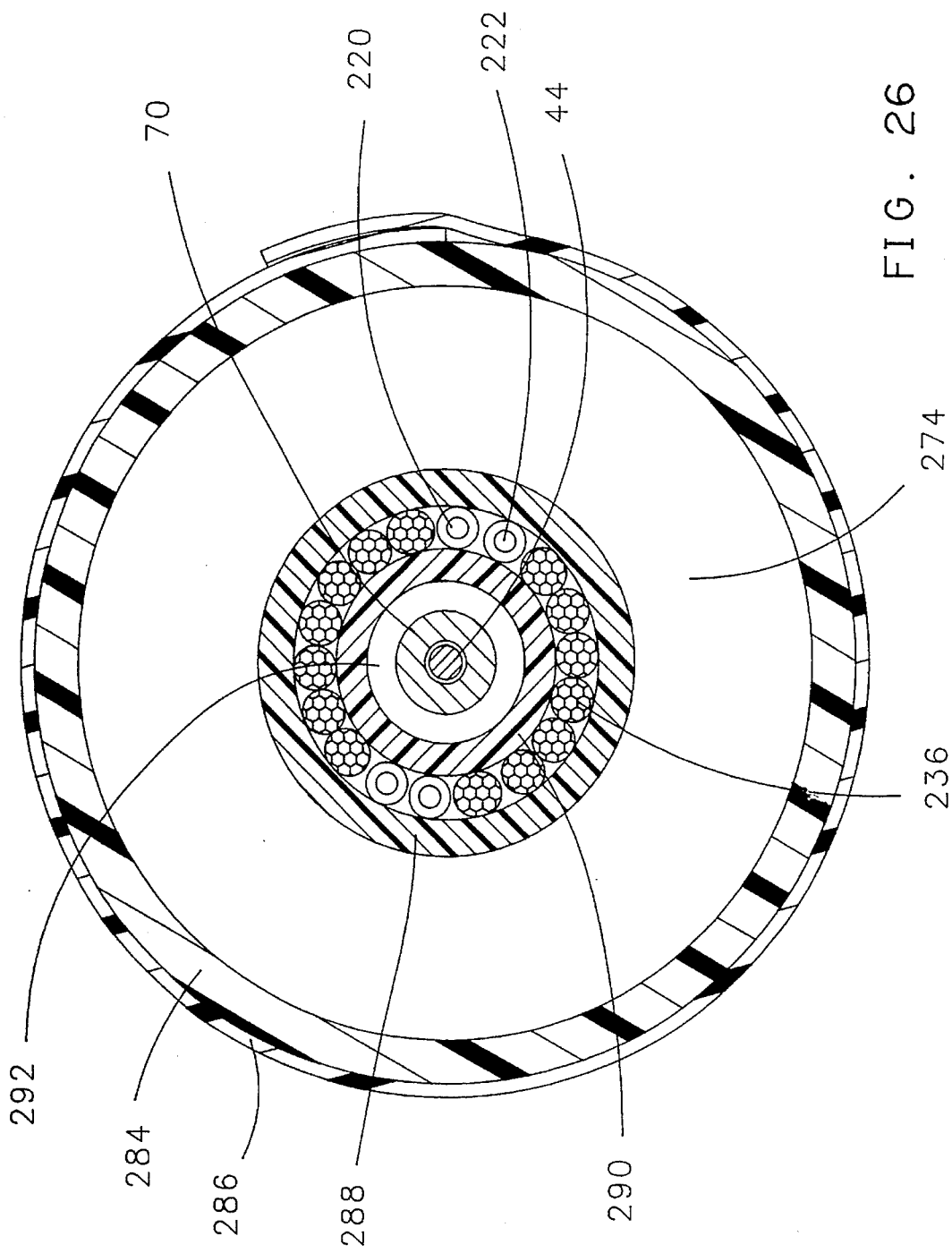
FIG. 26 is an enlarged cross sectional view of the cable hose assembly of the present invention taken generally along lines 26—26 of FIG. 22.
Figure 27:
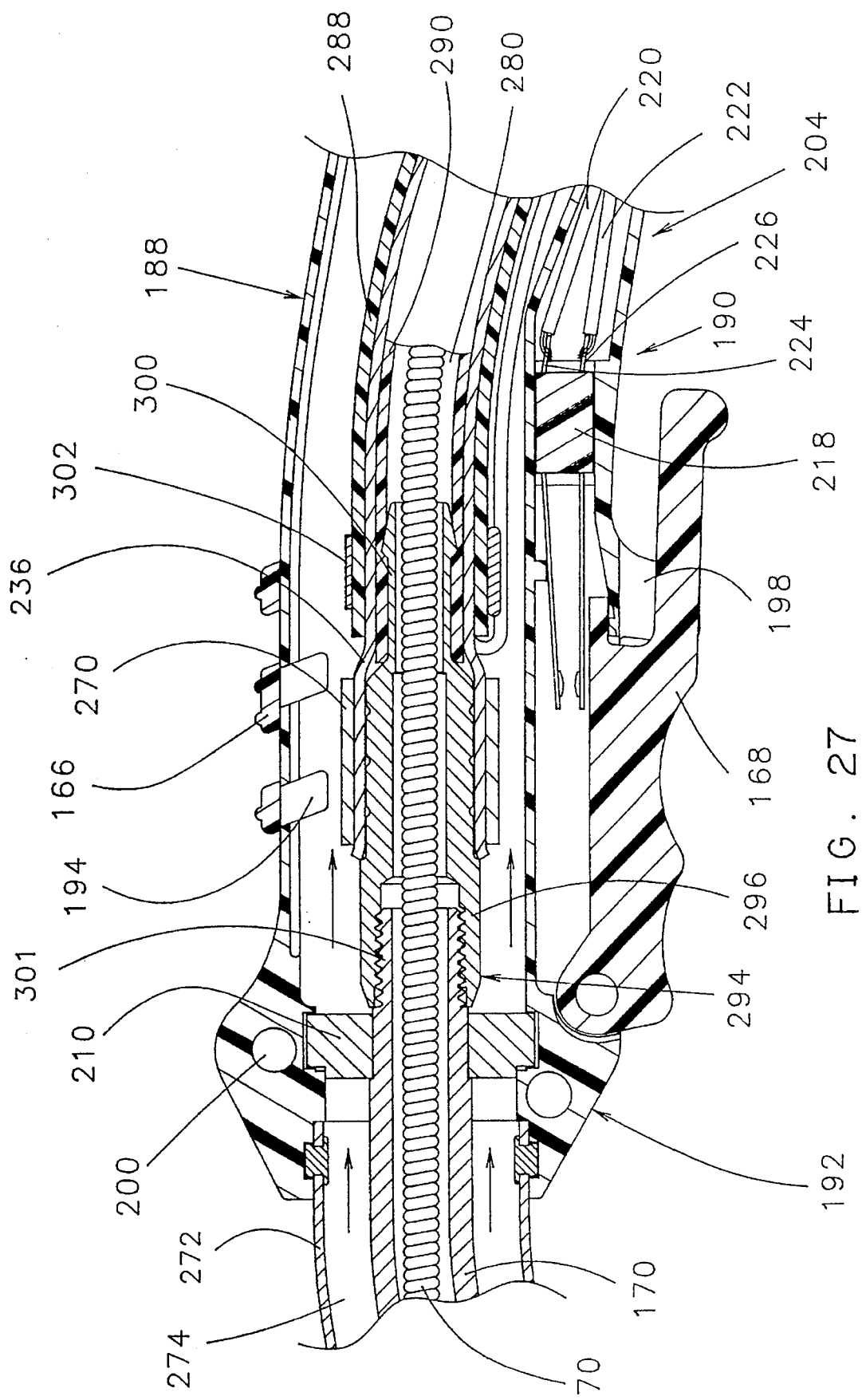
FIG. 27 is an enlarged cross sectional view of the handle and rear portion of the conductor tube assembly of the present invention.

The forward portion 192 of the handle 188 of the present embodiment includes a positioning spacer 210 therein which fixedly retains the conductor tube 170 which houses the preferably spiral wire conduit 70 and associated components in position in the handle 188 as described more fully below in connection with FIGS. 25 and 27 while allowing exhaust gases to flow therethrough to the vacuum system 152. The flexible trigger blades are generally identified by the numeral 212 and are actuated by depressing the elongate trigger 168 towards the lower surface 204 of the handle 168. The trigger blades 212 are shown in the open or off position in FIG. 22 so that the control circuit is open and the welding wire 44, inert gas and electrical current are not passing through the smoke gun assembly 160. When the elongated trigger 168 is depressed, a first electrical contact 214 is forced into electrical contact with a second electrical contact 216, thus closing the control circuit in the smoke gun system 150. When the control circuit is closed, the welding power source 12 provides welding wire 44, inert gas and electrical current to the smoke gun assembly 160. The first and second electrical contacts, 214 and 216, are mounted to flexible conductive members which are secured to base 218. A first control wire 220 and a second control wire 222 are each connected to male terminals 224 and 226 which extend from base 218, as shown in FIG. 27. The first and second control wires, 220 and 222, are preferably constructed of a twisted copper wire which extends the length of the coaxial cable 156 as shown in FIG. 26.

Figure 23:
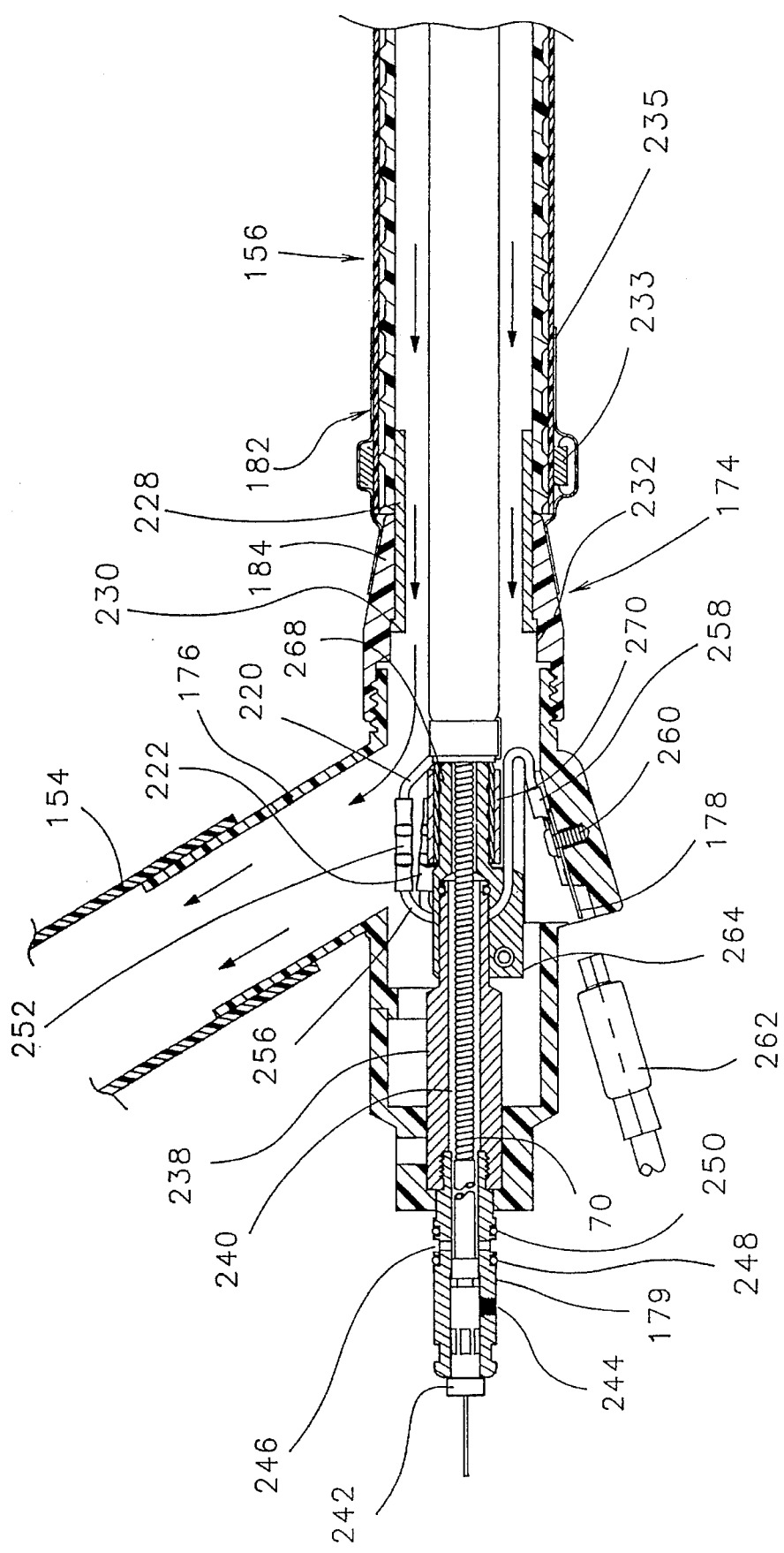
FIG. 23 is an enlarged cross sectional view of the rear case and cable hose assembly of the smoke gun system of the present invention.

FIG. 23 is a section view showing the assembled rear connector assembly 174 of the present embodiment. In this view, the rear connector assembly 174 has been rotated 180 degrees from normal operative use. The purpose of the rear connector assembly 174 is to provide a simplified connection between the coaxial cable hose 156 and the welding power source 12. The cable hose 156 is supported in the rear connector assembly 174 by a circumferential connector sleeve 228 which is enclosed by the rear sleeve 184 which is threaded thereover. The circumferential connector sleeve 228 reduces the flexing of the cable 156 at the connection with the rear connector assembly 174. The circumferential connector sleeve 228 includes an outwardly extending circumferential flange 230 which engages a channel 232 in the rear sleeve 184 thus preventing the circumferential connector sleeve 228 from slipping out of contact with the rear sleeve 184 and the rear connector assembly 174. The cable hose 156 and rear connector assembly 174 are further interconnected by a circumferential clamp 233 which is further enclosed by a protective sleeve 235.

The rear connector plug 179 extends rearwardly from the rear connector assembly 174 for connection to an adaptor 234 or directly to the welding power source 12. The connector plug 179 is formed of a conductive material to transfer electrical current from the welding power source 12 to copper stranding 236 in the cable hose 156 (FIG. 26). The connector plug 179 threadedly engages a rear connector tube 238 which is conductive to transfer electrical current from the welding power source 12 to the copper stranding 236. A central annular passage 240 extends through the connector plug 179 and the rear connector tube 238 to receive an enlarged diameter conduit stop 242 on the rear end of the conduit 70. The conduit stop 242 and conduit 70 may be removed from the rear end of the cable hose 156 if the conduit 70 wears out or becomes pinched. A set screw 244 is perpendicularly aligned in the connector plug 179 to fixedly retain the conduit stop 242 and conduit 70 in position in the cable 156. One or more gas passageways 246 are formed in the connector plug 179 to allow the inert gas to pass into the annular passage 240 in the cable hose 156. A pair of O-rings and channels, 248 and 250, are located circumferentially on each side of the gas passageways 246 to provide a gas tight seal between the adaptor 234 and connector plug 179.

The first and second control wires, 220 and 222, extend the length of the cable hose 156. The first control wire 220 includes a butt splice connector 252 thereon which is connected to the control wire 256 in the rear connector 174. The other end of the control wire 256 connects to another male terminal 258 which is held in place by a screw 260 to the interior of the electrical connector 178. The second control wire 222 is similarly connected to another male terminal (not shown) which is held in place by the screw 260 to the interior of the electrical connector 178. A female connector 262 extends from the welding power source 12 and is adapted to be plugged into the electrical connector 178.

A rear cable connector 264 is located in the interior of the rear connector assembly 174 and includes an elongated tubular extension 268 which interconnects the rear connector tube 238 and the cable hose 156. A circular crimp ring 270 attaches the copper stranding 236 of the cable hose 156 to the elongated extension 268.

Figure 24:
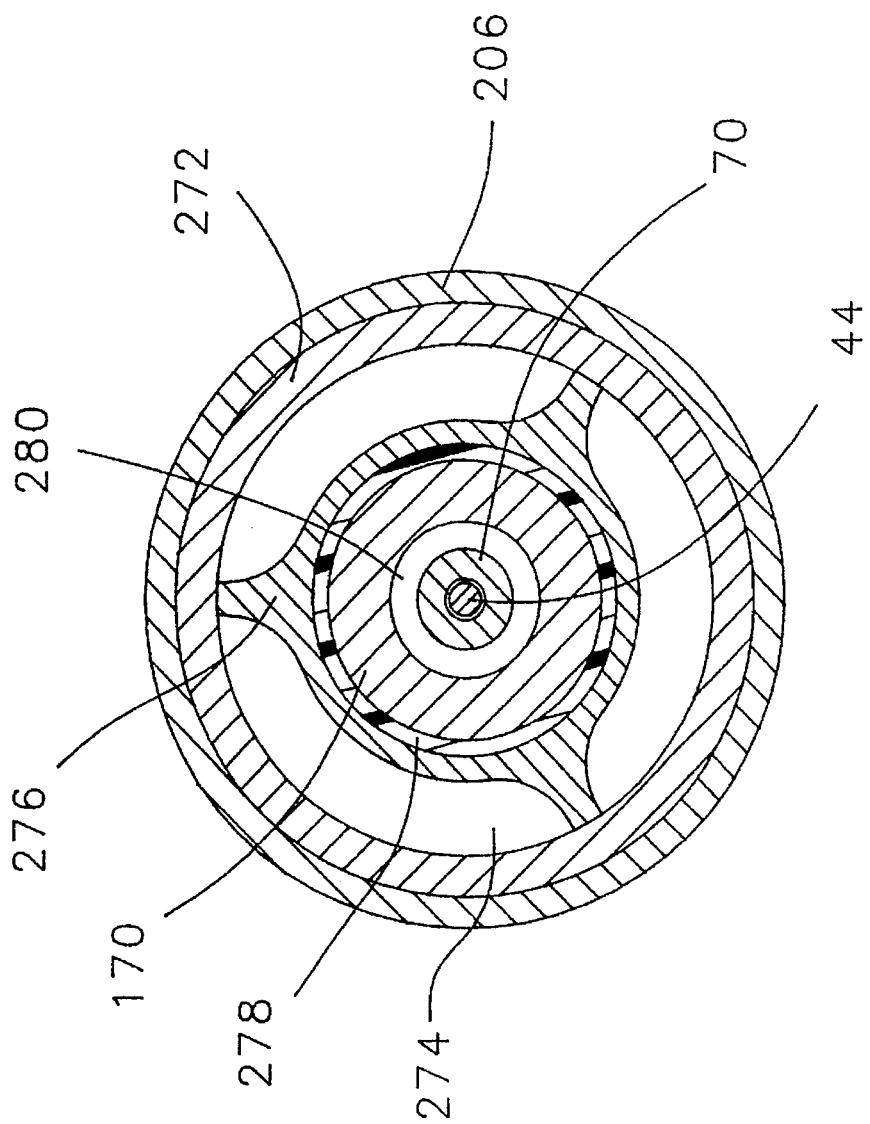
FIG. 24 is an enlarged cross sectional view of the conductor tube assembly showing the insulated conductor tube spacer design of the present invention taken along lines 24—24 of FIG. 22.

As shown in FIG. 24, the rear end of the smoke nozzle 206 securely engages the forward portion of a smoke tube 272 which forms a vacuum passageway 274 between the smoke nozzle 206 and the handle 188. A three pronged spacer 276 fixedly retains the conductor tube 170 and insulator 278 in position within the forward position of the smoke gun assembly 160. The conduit 70 and welding wire 44 extend through the forward portion of the smoke gun assembly 160 and are spaced apart from the inner surface of the conductor tube 170 to form an annular passage 280 for the passage of the inert gas therethrough.

Figure 25:
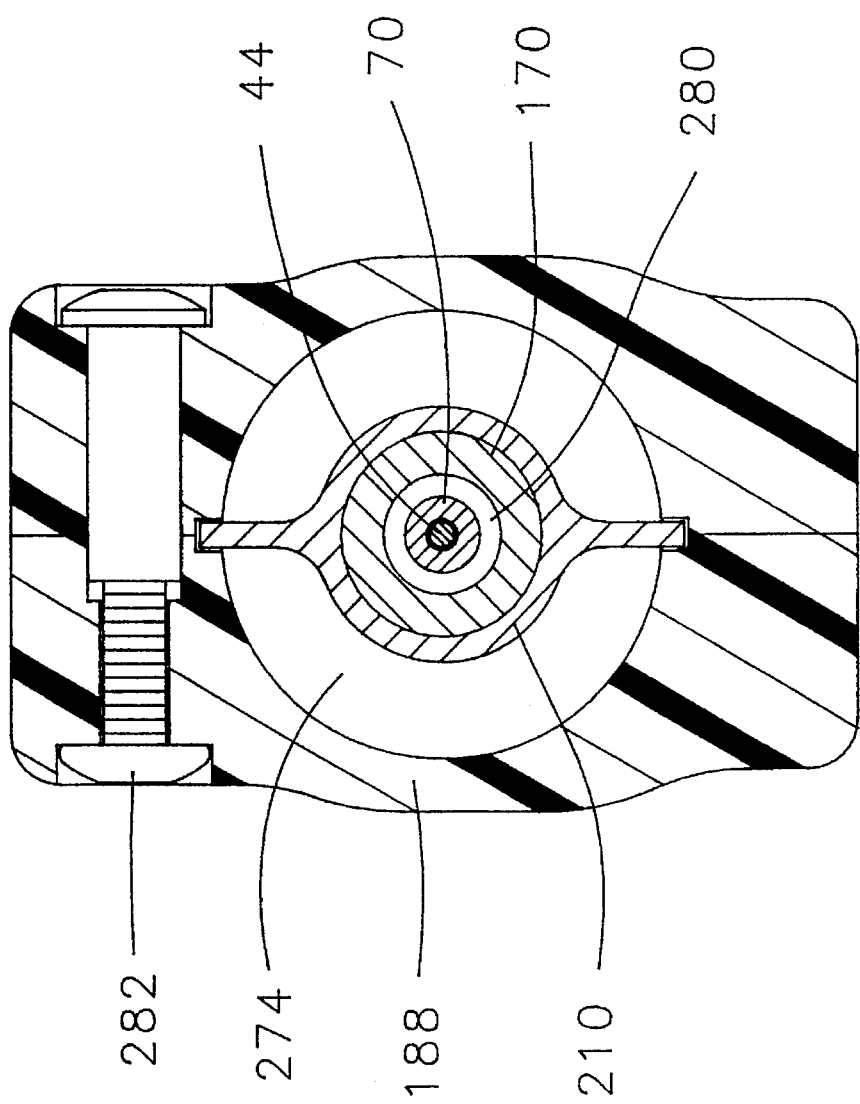
FIG. 25 is an enlarged cross sectional view of the handle assembly showing the handle spacer design of the present invention taken generally along lines 25—25 of FIG. 22.

FIG. 25 is an enlarged cross sectional view of the forward portion of the two piece handle 188. The pieces of the handle 188 are securely held together by the screw 282. The interconnection of the pieces of the handle 188 also securely hold the two prongs of the positioning spacer 210 in position within the handle 188. The interior of the spacer 210 fixedly engages the rear portion of the conductor tube 170 and the conductor tube 170 encloses the conduit 70 and welding wire 44. The annular passage 280 extends between the conduit 70 and the conductor tube 170 to allow the inert gas to flow therethrough. The vacuum passageway 274 is positioned between the interior surface of the handle 188 and the positioning spacer 210 to allow the smoke created during the welding process to be drawn therethrough.

FIG. 26 is an enlarged cross section view of the cable hose 156 of the smoke gun system 150 of the present embodiment. As shown in FIG. 26, the cable hose 156 includes two insulating sheaths 284 and 286 which preferably include at least one inner layer 284 formed of a flexible material such as neoprene with wire reinforcement and the outer or other layer 286 may be made from a leather or similar material with a connecting overlap as shown. The vacuum passageway 274 is formed between the interior surface of the outer insulating sheaths 284 and 286 and the exterior surface of the cable hose insulating sheath 288. The cable hose insulating sheath 288 is manufactured from materials such as santoprene or neoprene. The cable hose insulating sheath 288 surrounds the first and second control wires, 220 and 222, as well as the copper stranding 236. Further control wires are shown in FIG. 26 which may be used for further features that are not described herein. A further inner sheath 290 forms an inner barrier to separate the control wires, 220 and 222, and the copper stranding 236 from the inert gas which flows through the annular gas passageway 280 therein. Finally, the conduit 70 and welding wire 44 extend centrally through the cable 156.

FIG. 27 is an enlarged cross-sectional view of the forward portion 192 of the handle 188 showing the vacuum control assembly 166 in the closed position. The elongate trigger 168 and related components are described in more detail above and therefore will not be discussed fully with respect to FIG. 27. As shown in FIG. 27, the positioning spacer 210 holds the conductor tube 170 fixedly positioned within the forward portion 192 of the handle 188. The smoke gun assembly 160 includes a forward interior cable connector 294 which connects the forward end of the outer insulating sheath 288 and the inner sheath 290 with the conductor tube threaded segment 301. As shown in FIG. 27, the interior cable connector 294 includes a first segment 296 which threadedly receives the threaded segment 301 of the conductor tube 170 thereon and a second segment 300 which fits tightly within the inner sheath 290 due to a crimp ring 302 that fits tightly over the outer sheath 288. The copper stranding 236 extends beyond the inner sheath 290 to contact the outer surface of the interior cable connector 294 which is formed of a conductive material. The copper stranding 236 is retained on the interior cable connecter 294 by a crimp ring 270 to ensure that the copper stranding 236 remains in conductive contact with the interior cable connector 294. The conduit 70 which feeds wire as shown extends continuously through the inner sheath 290 without being affected by the interconnections between the handle 188 and conductor tube 170.

Figure 28:
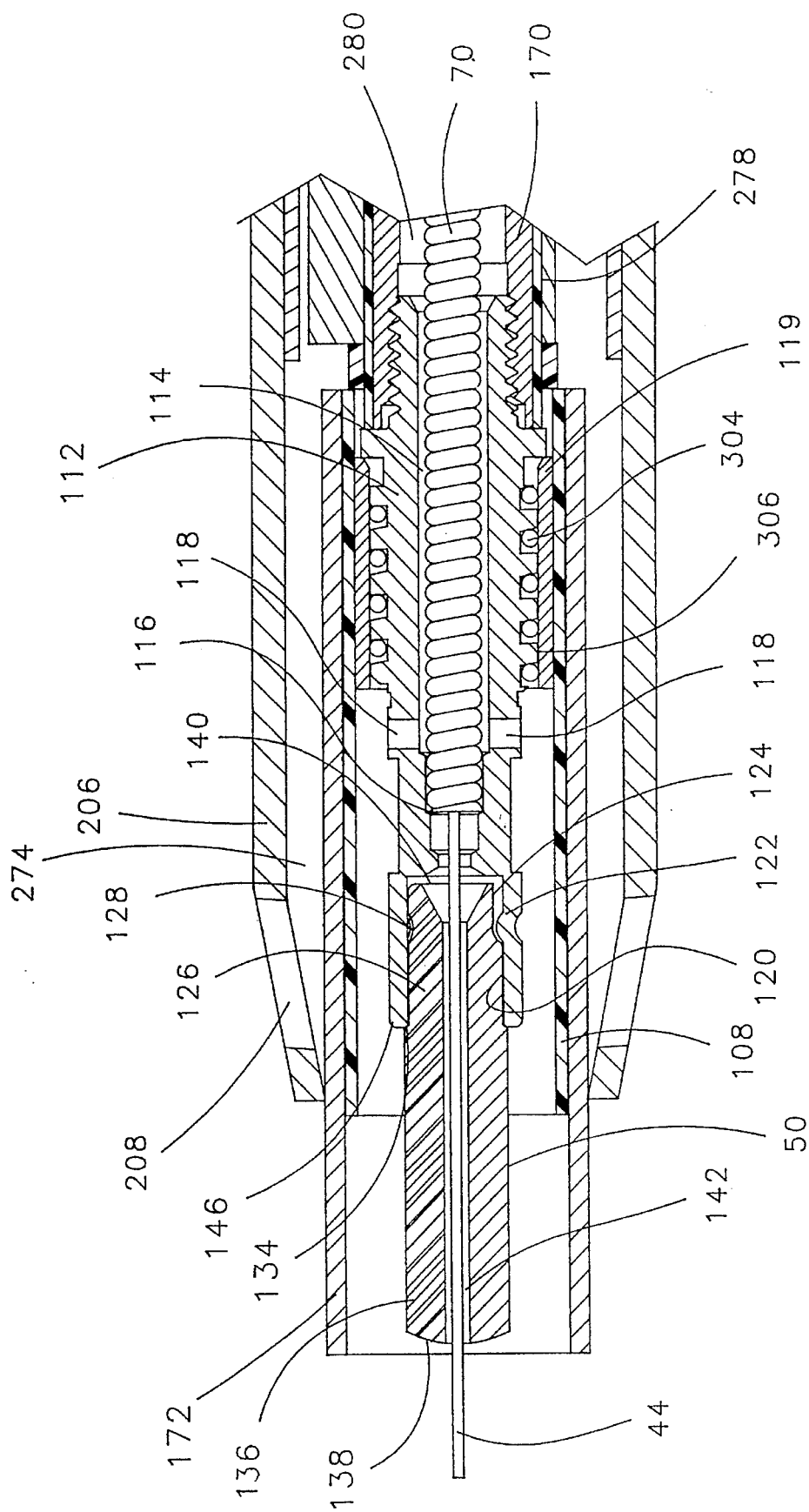
FIG. 28 is an enlarged cross sectional view showing the front portion of the conductor tube assembly showing the consumable parts of the present invention.

As shown in FIGS. 28–32, the contact tip 50 and gas diffuser 112 as used in the smoke gun assembly 150 are nearly identical to the contact tip 50 and gas diffuser 112 described above with respect to the spool gun system 10 and therefore, like numbers have been added to like elements or members. FIG. 28 also illustrates the use of a spiral spring 304 in combination with an approximately square thread 306 on the exterior surface of the gas diffuser 112 to provide an increased mechanical grip between the welding nozzle 172 and gas diffuser 112. The spiral spring 304 expands in radial diameter when the welding nozzle 172 is rotated about the conductor tube 170 in one direction and decreases in diameter in the other direction of rotation about the conductor tube 170 to allow for the convenient removal of the welding nozzle 172 therefrom. Additionally, the smoke nozzle 206 is shown mounted on the welding nozzle 172 to form the vacuum passageway 274 therebetween.

The features described above with respect to the contact tip 50 and gas diffuser 112 of the first preferred embodiment are equally applicable to the contact tip 50 and gas diffuser 112 of the present embodiment and include the improved electrical conductivity and heat dissipation as described above. Reference should be made to the above description of these elements which are further shown in FIGS. 28–32 to illustrate one of the common features of the embodiments of the present invention but which are not repeated separately herein for the sake of brevity.

When the elongate trigger 168 of the smoke gun assembly 150 is actuated by the operator, the conduction of electrical current through the smoke gun assembly 150 occurs in the same manner as described above with respect to the spool gun system 10. The welding wire 44 is also pushed through the smoke gun assembly 150 in generally the same manner as described above with respect to the spool gun system 10 except that the welding wire 44 is uncoiled from the spool 158 which is preferably mounted on the power source 12 close to one or more motor operated roller 54. The welding wire 44 is then pushed by the roller 54, through the connector plug 179 and cable 156 to the smoke gun assembly 160.

The vacuum source 152 of the present embodiment may be actuated by the actuation of the trigger 168 or it may operate independently of the trigger 168. The vacuum is applied to the smoke gun system 150 so that a majority of the smoke or fumes and gases created by the welding process are drawn into the angled openings on the smoke nozzle 206 of the smoke gun assembly 160. The smoke is then drawn rearwardly through the vacuum passageway 274. The amount of smoke withdrawn through the vacuum passageway 274 will depend on the angle of the welding nozzle 172 to the workpiece 42 and the position of the vacuum control 166 on the smoke gun assembly 160. If all of the openings 194 in the handle 188 are obstructed by the slide member 196, more vacuum will be applied through the angled openings 208. If the openings 194 are partially or completely unobstructed, less vacuum will be applied by the vacuum source 152 at the angled openings 208. Thus, less smoke will be pulled through the angled openings 208. The ability of the operator to manually adjust the vacuum applied during the welding process is an important feature because it allows the operator to ensure that the inert gas is able to adequately surround the welding wire 44 at the workpiece 42 while also allowing the operator to adjustably remove the smoke. As diagrammatically shown in FIG. 22, the smoke (through openings 208) and a desired amount of air (through openings 194) are drawn through the handle, through the cable 156 and Y-connector 176 and into the vacuum hose 154. The smoke is then preferably filtered by a suitable filter in the vacuum source 152.

While the foregoing is directed to the preferred embodiment of the present invention, other and further embodiments of the invention may be devised without departing from the basic scope thereof, and the scope thereof is determined by the claims which follow.

We claim:

1. A welding gun assembly including:

A. A handle member having forward and rear end portions thereon and a means for actuating the flow of a welding wire, inert gas and electrical current therethrough;

B. Said welding wire being supplied by a spool member operatively associated with said assembly;

C. Said inert gas being supplied by a gas source operatively associated with said assembly;

D. Said electrical current being supplied by a power source operatively associated with said assembly;

E. A generally tubular conductor tube having forward and rear end portions and which extends from said forward end portions of said handle member and wherein said welding wire, inert gas and electrical current are received therethrough;

F. A generally cylindrical gas diffuser having a forward end portion and a rear end portion operatively associated with said forward end portion of said conductor tube, said gas diffuser being formed of a material which conducts said electrical current therethrough and is shaped to receive said welding wire therethrough, said gas diffuser including a first passageway which extends through at least a portion thereof and a retaining means which extends inwardly into said passageway; and G. A generally cylindrical contact tip having forward and rear end portions, said contact tip including a circumferential channel on said rear end portion thereof, a tangential flat surface extending along at least a portion of said rear end portion and intersecting said channel, and a circumferential shoulder disposed between said forward end portion and said channel, said channel being sized to conductively receive said retaining means therein such that electrical current may be conducted therebetween, said shoulder being adapted for abutting contact with said forward end portion of said gas diffuser when said retaining means is received in said channel.

2. The welding gun assembly of claim 1 wherein said rear end portion of said handle member is angled approximately 10 degrees with respect to said forward end portion of said handle member.

3. The welding gun assembly of claim 2 wherein said handle member includes a generally oval shaped top surface and a generally rectangularly shaped lower surface thereon.

4. The welding gun assembly of claim 1 wherein said shoulder is an annular shoulder extending completely around said contact tip.

5. The welding gun assembly of claim 1 wherein said gas diffuser includes one or more ports therein to cause said inert gas to flow from a gas passageway in said rear end portion thereof to a location externally thereof.

6. The welding gun assembly of claim 1 wherein said gas diffuser weighs between about 42 grams and 64 grams.

7. The welding gun assembly of claim 6 wherein said gas diffuser is threadedly retained on said forward end portion of said conductor tube and at least a portion of said contact tip is received in said first passageway of said gas diffuser.

8. The welding gun assembly of claim 1 wherein said contact tip weighs about 14 grams or more.

9. The welding gun assembly of claim 1 wherein the diameter of said forward end portion of said contact tip is greater than the diameter of said rear end portion of said contact tip and said gas diffuser and contact tip conductively contact each other at the circumferential shoulder formed thereby.

10. The welding gun assembly of claim 1 wherein said contact tip and gas diffuser conductively contact each other in at least three contact areas.

11. The welding gun assembly of claim 1 wherein said channel of said contact tip varies in depth about the circumference of said contact tip.

12. The welding gun assembly of claim 1 wherein said channel of said contact tip varies in width about the circumference of said contact tip.

13. The welding gun assembly of claim 1 wherein said conductor tube includes a smoke hood operatively mounted thereon to form a vacuum passageway therebetween.

14. The welding gun assembly of claim 13 wherein said handle member includes a vacuum control operatively associated therewith.

15. The welding gun assembly of claim 14 wherein said vacuum control is selectively operable to allow air to flow into said handle member.

16. The welding gun assembly of claim 15 wherein said vacuum control includes a slide member to selectively obstruct openings in said handle member.

17. The welding gun assembly of claim 1 wherein said rear end portion of said handle member is oriented at an angle of about 10 degrees with respect to forward end portion of said handle member and said conductor tube includes a nozzle hood operatively mounted thereon to form a vacuum passageway therebetween and the flow of a vacuum therethrough is selectively controlled by a vacuum control member on said handle member.

18. The welding gun assembly of claim 1 wherein said contact tip has an average maximum operating temperature of about 875 degrees F.

19. The welding gun assembly of claim 1 wherein the Brinell hardness of said contact tip during the operation of said assembly is about 70.

20. The welding gun assembly of claim 1 wherein said contact tip is sized for use on a 200 amp. or less MIG welding system and the weight of said contact tip is about 7 or more grams.

21. The welding gun assembly of claim 20 wherein the weight of said gas diffuser is about 40 grams.

22. The welding gun assembly of claim 20 wherein the length of said contact tip is about one inch.

23. The welding gun assembly of claim 20 wherein the diameter of said contact tip is about 0.283 inches.

24. A welding gun assembly including:

A. A handle member having forward and rear end portions thereon wherein said rear end portion is oriented approximately 10 degrees offset from said forward end portion, said handle member including an elongate trigger member thereon and said trigger member extends between a lower surface of said forward end portion and a lower surface of said rear end portion, said trigger member being movable between actuated and non-positions wherein the flow of a welding wire, inert gas and electrical current is enabled through the handle member in the actuated position of said trigger member;

B. Said welding wire being supplied by a spool member when said trigger member is actuated;

C. Said inert gas being supplied by a gas source when said trigger member is actuated;

D. Said electrical current being supplied by a power source when said trigger member is actuated;

E. A generally tubular conductor tube having forward and rear end portions and which operatively extends from said forward end portion of said handle member and wherein said welding wire, inert gas and electrical current are received therethrough;

F. An elongate gas diffuser having a forward end portion and a rear end portion operatively associated with said forward end portion of said conductor tube, said gas diffuser being formed of a material which conducts electrical current therethrough, said diffuser having an elongate passageway therethrough which receives said welding wire therethrough, said inert gas passing through at least a portion of said passageway and through one or more ports in said gas diffuser;

G. Retaining means on the diffuser projecting into said passageway; and

H. A generally cylindrical contact tip having a forward end portion and a rear end portion which is receivable in the passageway in the forward end portion of the gas diffuser, said contact tip including a circumferential channel on said rear end portion thereof, a tangential flat surface extending along at least a portion of said rear end portion and intersecting said channel, and a circumferential shoulder disposed between said forward end portion and said channel, said channel being sized to conductively receive said retaining means therein such that electrical current may be conducted therebetween, said shoulder being adapted for abutting contact with said forward end portion of said gas diffuser when said retaining means is received in said channel.

25. The welding gun assembly of claim 24 wherein at least three electrical current conduction areas are formed between said gas diffuser and said contact tip when said contact tip is operatively received on said gas diffuser.

26. The welding gun assembly of claim 24 wherein said shoulder is an annular shoulder extending completely around said contact tip.

27. The welding gun assembly of claim 26 wherein said channel varies in depth and width about the circumference of said contact tip.

28. The welding gun assembly of claim 24 wherein said handle member includes a vacuum passageway operatively associated therewith and said conductor tube includes a smoke hood thereon to form a portion of said vacuum passageway therebetween.

29. The welding gun assembly of claim 24 wherein said handle member includes a vacuum control member thereon.

30. The welding gun assembly of claim 29 wherein said vacuum control member includes a slide member which selectively obstructs one or more openings on said handle member.

31. The welding gun assembly of claim 24 wherein said handle member is operatively connected to said power source by an elongate cable and said cable includes interchangeable and reversible forward and rear end portions thereon.

32. The welding gun assembly of claim 24 wherein said contact tip has an average maximum operating temperature of about 875 degrees F.

33. A smoke gun assembly having a power source, a source of inert gas and a supply of welding wire operatively associated therewith, said assembly including:
   A. a vacuum assembly;
   B. an elongate contact tip having forward and rear end portions thereon, said forward end portion having a diameter greater than the diameter of said rear end portion whereby a circumferential shoulder is formed therebetween;
   C. a circumferential channel on said rear end portion of said contact tip, said channel being spaced rearwardly from said shoulder and being adapted to receive retaining means on the gun to retain the contact tip on the gun;
   D. a generally flat surface oriented tangentially with respect to the circumference of said rear end portion, said flat surface intersecting a portion of said channel; and
   E. an elongate passageway extending lengthwise through said contact tip wherein said contact tip is adapted to receive a welding wire therethrough.

34. The smoke gun assembly of claim 33 wherein said assembly further includes an elongate gas diffuser formed of an electrically conductive material, said gas diffuser including an elongate passageway therethrough and wherein said passageway is sized to receive at least a portion of said contact tip therein, said retaining means comprising:

a protrusion on said gas diffuser wherein said protrusion extends inwardly into said passageway and is sized to conductively contact said channel on said contact tip to releasably retain at least a portion of said contact tip therein.

35. The smoke gun assembly of claim 34 wherein said contact tip and said gas diffuser form at least three electrically conductive contact areas therebetween, and wherein said shoulder is an annular shoulder extending completely around said contact tip.

36. The smoke gun assembly of claim 33 wherein said assembly further includes a handle member having a manually operable vacuum control thereon to adjust the flow of a vacuum through said vacuum assembly.

37. The smoke gun assembly of claim 36 wherein said handle member includes forward and rear end portions wherein said rear end portion is oriented at an angle of about 10 degrees from said forward end portion, said handle member further including upper and lower surfaces wherein said upper surface is generally oval shaped and said lower surface is generally rectangular shaped.

* * * * *

UNITED STATES PATENT AND TRADEMARK OFFICE
CERTIFICATE OF CORRECTION

PATENT NO. : 5,491,321

DATED : February 13, 1996

INVENTOR(S) : Kyle H. Stuart and Dale R. Bervig

It is certified that error appears in the above-identified patent and that said Letters Patent is hereby corrected as shown below:

Column 22, claim 24, line 18, "non-positions" should read ---non-actuated positions---.

Signed and Sealed this

Fifteenth Day of October, 1996

Attest:

BRUCE LEHMAN

*Attesting Officer*          Commissioner of Patents and Trademarks